United States Patent [19]

Misheski et al.

[11] Patent Number: 5,878,432
[45] Date of Patent: Mar. 2, 1999

[54] OBJECT ORIENTED FRAMEWORK MECHANISM FOR A SOURCE CODE REPOSITORY

[75] Inventors: David Joseph Misheski, Plainview; Clifton Malcolm Nock, Rochester, both of Minn.

[73] Assignee: International Business Machines Corporation, Armonk, N.Y.

[21] Appl. No.: 740,383

[22] Filed: Oct. 29, 1996

[51] Int. Cl.$^6$ ..................................................... G06F 17/30
[52] U.S. Cl. ........................ 707/103; 707/104; 707/203; 395/712
[58] Field of Search ..................................... 707/103, 200, 707/104, 203; 395/685, 704, 710, 712

[56] References Cited

U.S. PATENT DOCUMENTS

| | | | |
|---|---|---|---|
| 5,437,027 | 7/1995 | Bannon et al. ........................... | 707/103 |
| 5,488,721 | 1/1996 | Rich et al. ............................... | 707/103 |
| 5,499,365 | 3/1996 | Anderson et al. ....................... | 707/203 |
| 5,603,027 | 2/1997 | Ohkami .................................... | 707/200 |
| 5,644,771 | 7/1997 | Endicott et al. ......................... | 395/712 |
| 5,701,472 | 12/1997 | Koerber et al. ........................ | 707/203 |
| 5,740,440 | 4/1998 | West ........................................ | 395/704 |
| 5,745,764 | 4/1998 | Leach et al. ............................ | 395/565 |
| 5,787,425 | 7/1998 | Bigus ....................................... | 707/6 |

*Primary Examiner*—Thomas G. Black
*Assistant Examiner*—Greta L. Robinson
*Attorney, Agent, or Firm*—Martin & Associates, L.L.C.; Derek P. Martin

[57] ABSTRACT

An object oriented framework mechanism provides a straightforward and convenient way to implement an source code repository for tracking the configuration of various releases of a software product. The source code repository framework includes several classes that are extensible according to the needs of the user. The class relationships define the core function of the framework mechanism. Extensible classes include a source class, a product class, a release class, a version class, a data class, and a lock state class. These extensible classes are extended by a programmer to implement a desired source code repository environment. The framework provides consistent programmer interfaces over a wide variety of different source code repository environments, which greatly enhances programmer efficiency and which makes the resultant code much easier to maintain.

60 Claims, 33 Drawing Sheets

OBJECT ORIENTED FRAMEWORK MECHANISM FOR A SOURCE CODE REPOSITORY

FIELD OF THE INVENTION

The present invention relates in general to the data processing field. More specifically, the present invention relates to the field of Object Oriented framework mechanisms.

BACKGROUND OF THE INVENTION

The development of the EDVAC computer system of 1948 is often cited as the beginning of the computer era. Since that time, computer systems have evolved into extremely sophisticated devices, including complex combinations of hardware and software. Software products are typically written in a high level language (HLL) in many separate pieces (such as procedures, modules, and objects). For the purposes of convenience in discussing the concepts of the invention disclosed herein, any piece of software that may be separately processed from other pieces are referred to generically herein as "modules", recognizing that a module may be a procedure, an object, or any other suitable piece of software. The HLL version of the software is known as source code. Each source code module is typically processed separately by a software tool known as a compiler, and the modules are then integrated together using a software tool known as a linker. When a change to a program is needed, one or more modules of the program that need to be changed may be changed and compiled without re-compiling unaffected modules. The newly changed and compiled modules may then be linked with the unaffected modules, resulting in a new software product with enhanced capabilities when compared to the previous release.

The modular approach to programming described above gives great flexibility in changing features of a software product. This flexibility, however, requires careful tracking of each different module that makes up a release of the software product. Several different releases may need to be available at any given time, which may require that several different versions of the same module be available at the same time. A storage area for holding all different modules of a software product is referred to herein as a source code repository. Known computer systems track software configurations stored within a source code repository using proprietary code that is programmed for a specific source code repository environment. If a new and different environment is desired, the source code repository software must be modified to accommodate the new environment. Making this type of modification requires an in-depth knowledge of the specific source code repository software being used. No common programming interface is used, and reusing code on one system in a different environment may be unpractical. Without a mechanism that can be readily customized and extended to provide a source code repository that has the desired functionality, the time required to program and maintain source code repository software will be excessively long and expensive.

SUMMARY OF THE INVENTION

According to the present invention, an object oriented framework mechanism for a source code repository provides an infrastructure that embodies the steps necessary to store and track different releases of code and a mechanism to extend the framework to fit a particular source code repository environment. Certain core functions are provided by the framework, which interact with extensible functions provided by the framework user. The architecture of the framework allows a developer to determine the conditions and parameters that apply to the source code repository while allowing a programmer to interact with the framework with an interface that is consistent regardless of the specific combination of parameters specified in the source code repository environment. The extensible functions allow new repository environments to be easily implemented using the framework. The framework thus allows a common programming interface for depositories implemented using the framework, which may be easily customized to include new or changed parameters. The framework greatly simplifies the programmer's job of developing a source code repository by providing a common programming interface, and by providing established classes that may be easily extended to implement the desired source code repository environment.

The framework mechanism of the present invention was designed and constructed using object-oriented technology. Those who are unfamiliar with object-oriented technology, or with object-oriented framework mechanisms, should read the object-oriented overview section of the Description of the Preferred Embodiments.

DESCRIPTION OF THE PREFERRED EMBODIMENTS

Overview—Object-Oriented Technology

Figure 1:
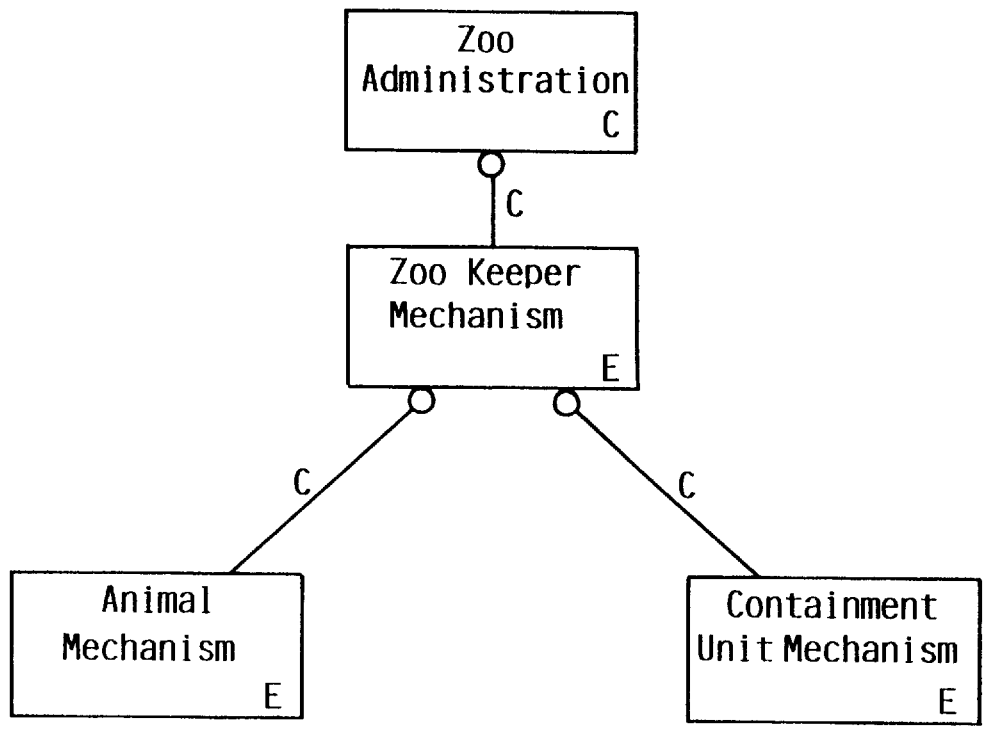
FIG. 1 is a category diagram of an example framework mechanism.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF is Designed

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification (pages 34–40). Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, please refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation of the zoo keeper mechanism. Note also that our framework designer designed the zoo administration mechanism to be a core function of ZAF, which means that it has been designed such that it will not be subject to potential customization and extension. The C in the category box denotes this fact. Please note further that the uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and/or extension by the framework consumer to address future care and feeding requirements. This fact is denoted by the E in the zoo keeper mechanism category box.

Our framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2A:
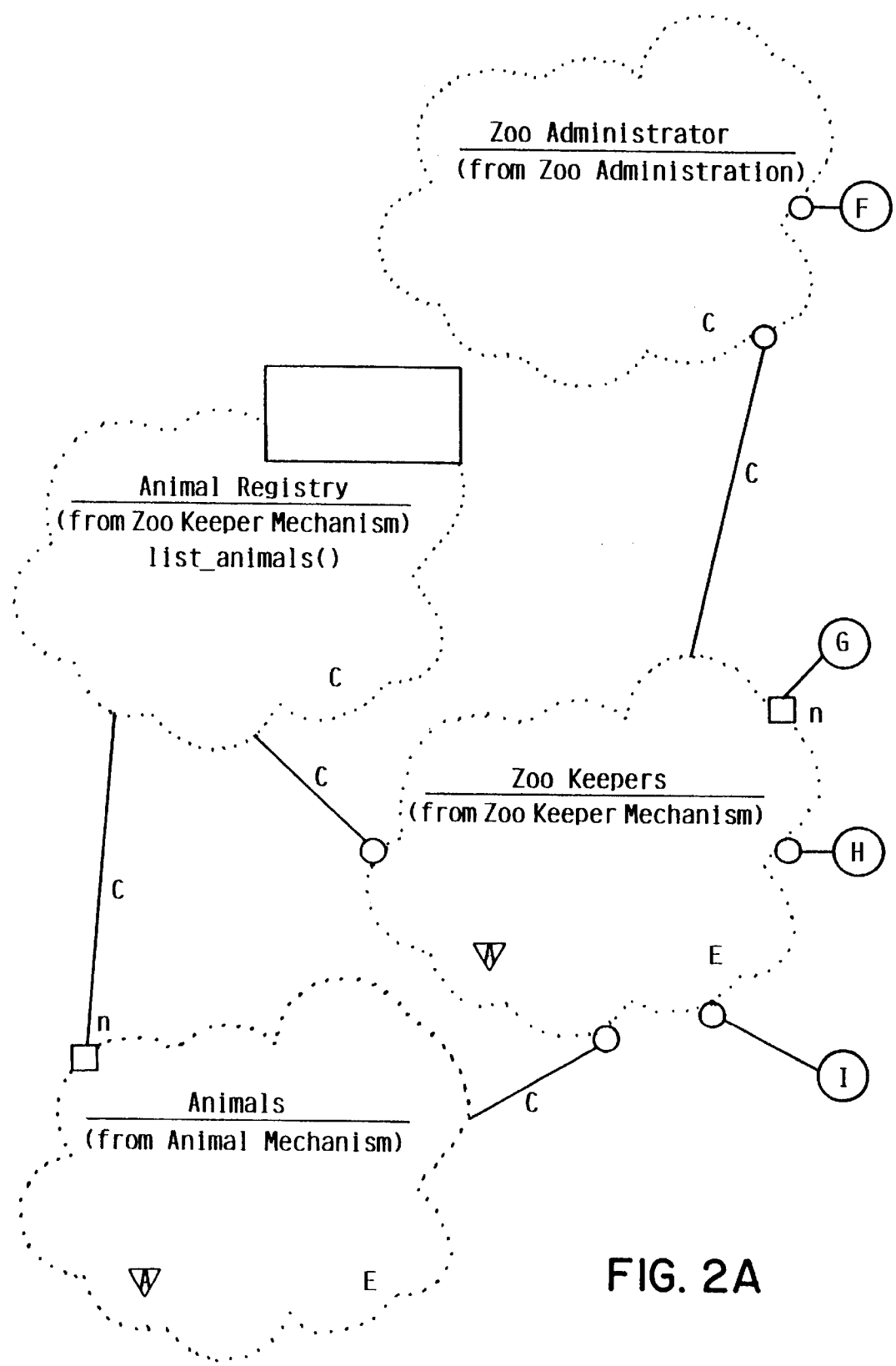
FIGS. 2 through 6 are class diagrams for the example framework mechanism of FIG 1.
Figure 2B:
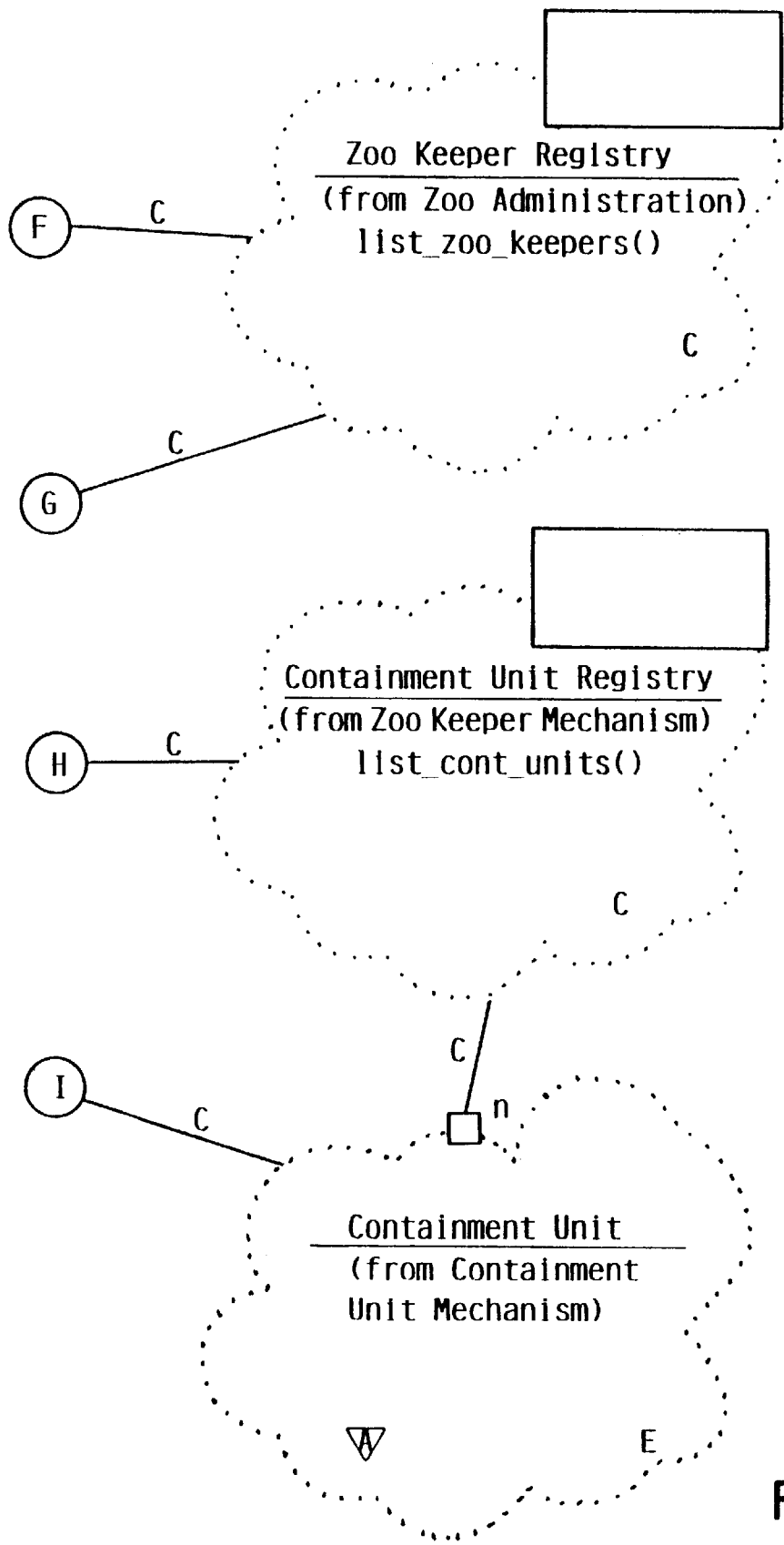

FIG. 2 is an OO class diagram that shows the fundamental classes that our framework designer has designed for ZAF. Each class representation includes its relationship to the mechanisms shown on FIG. 1. For example, we can see that the zoo keepers class is denoted as being from Zoo Keeper Mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

Please note again that the relationships between the classes have been designed as core function of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administrator class has been designed to have a uses relationship with the zoo keeper registry. Our framework designer has designed the zoo administrator and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

Figure 3:
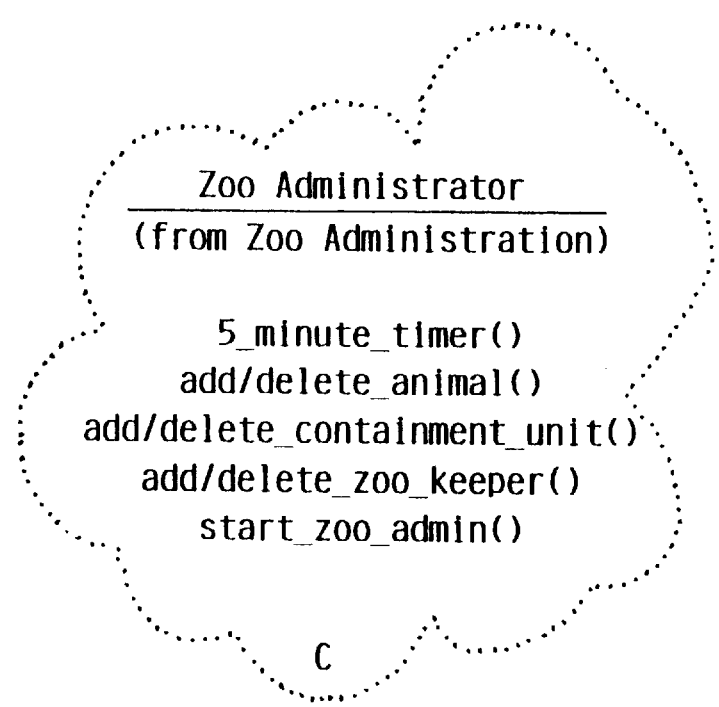

FIG. 3 shows a lower level view of the zoo administrator class. Since objects of type zoo administrator have responsibility for overall control of ZAF, the zoo administrator class has been designed to include operations that perform tasks oriented towards zoo administration. The class definition includes the following five operations: 5_minute_timer( ), add_animal( ), add_containment_unit( ), add_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. Once started, our framework designer has designed the start_zoo_admin( ) operation to initiate the 5_minute_timer( ) operation. Every five minutes, the 5_minute_timer( ) operation instructs the zoo keeper objects to go out and check on the animals. The add/delete_zoo_keeper operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal( ) operation is responsible for interacting with users to define additional zoo animal classes and objects and to remove classes and objects that are no longer needed. Again, it is quite natural for a zoo to need to add and remove animals. The add/delete_containment_unit( ) operation is responsible for the definition of new containment unit classes and objects and for removal of classes and/or objects that are no longer necessary. Again, our framework designer has designed ZAF in a way that provides this flexibility by designing the animal and containment unit mechanisms as extensible functions.

Referring back to FIG. 2, the zoo keepers class definition has a uses relationship with the animal registry, animals, containment unit registry, and containment units classes.

Since the value of ZAF is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

While the classes and categories within ZAF have been described as either core functions or extensible functions, it is important to note that the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (i.e., the overall framework function imposed by the structure and functional requirements of the framework). For example, the animals class has been designed as extensible function of ZAF so that ZAF can be customized to accommodate different types of animals. However, the ability to customize the extensible animals class does not imply that the nature of the customization can violate the basic structure imposed by the core function of ZAF (e.g., by customizing the animal class to the extent that it can no longer be reasonably said to represent a type of animal).

Figure 4:
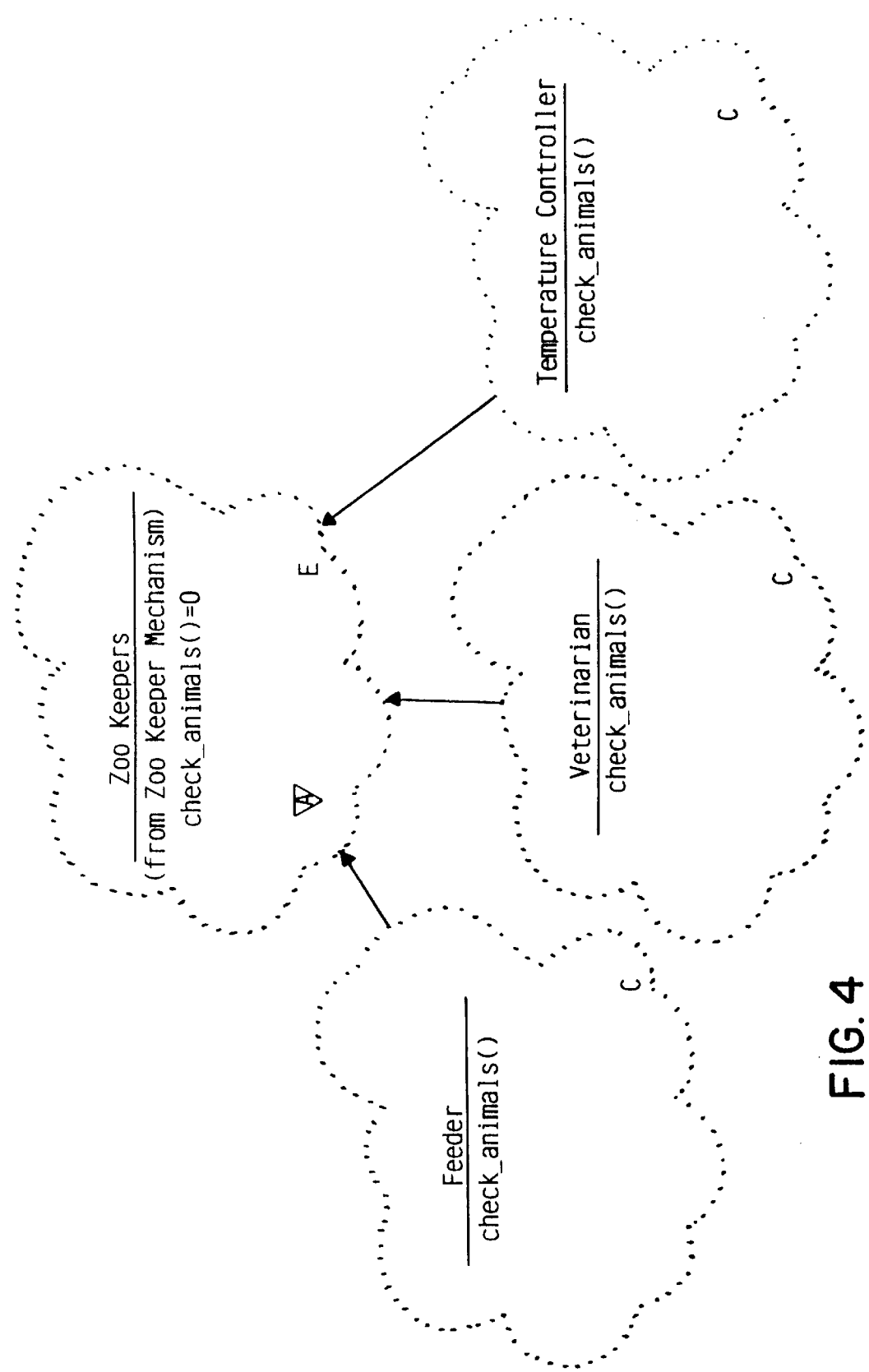

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (like the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact the action is actually performed. In other words, client objects need only understand that certain objects perform certain functions, not how those functions are actually carried out. This is one way in which a properly designed framework can be readily customized and extended to satisfy future requirements.

Figure 5:
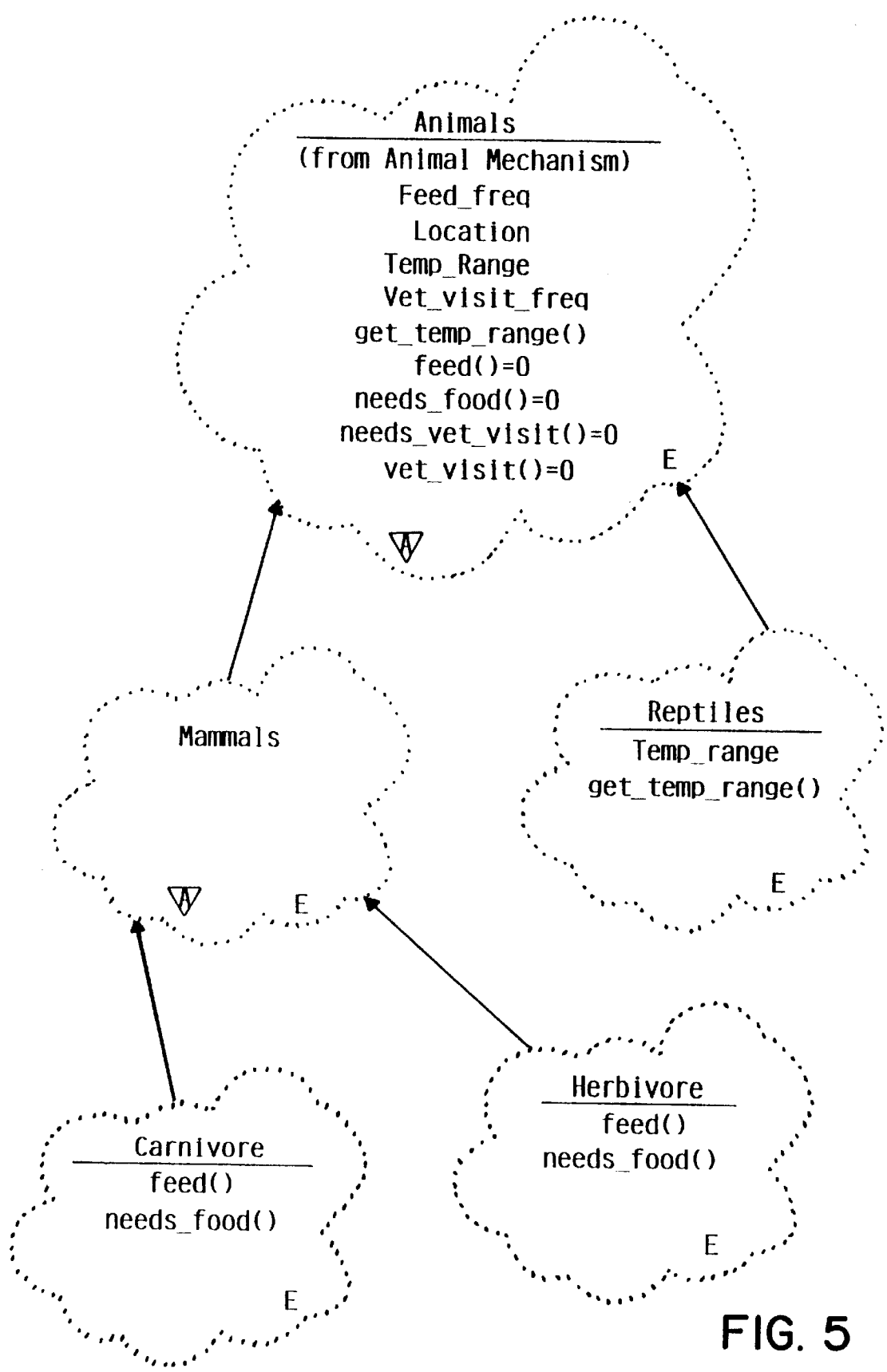

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility. As shown, the example animal class definition includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed ( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed ( ) operation has been left up to the subclasses, subclasses carnivore and herbivore each have their own definition of the feed( ) operation. Again, this is a good design choice because meat eating carnivores are going to have different needs than their plant eating counterparts.

Figure 6:
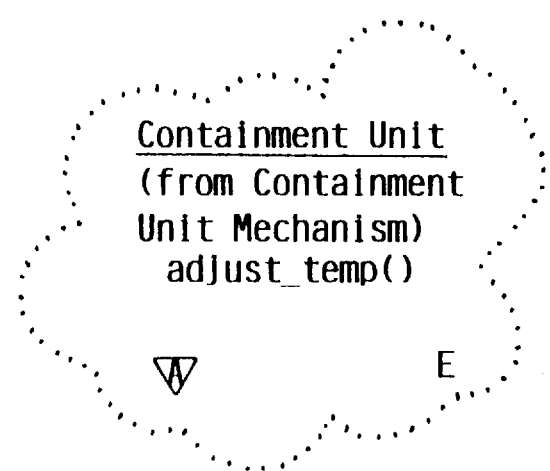

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself FIG. 6 is a class diagram showing a lower level view of the containment unit class. The containment unit class contains virtual operation definition adjust_temp( ). The adjust_temp definition defines both the interface and mechanism used to actually adjust the temperature in the containment units of the zoo (i.e., via heating and cooling mechanisms which are not shown).

How the ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7A:
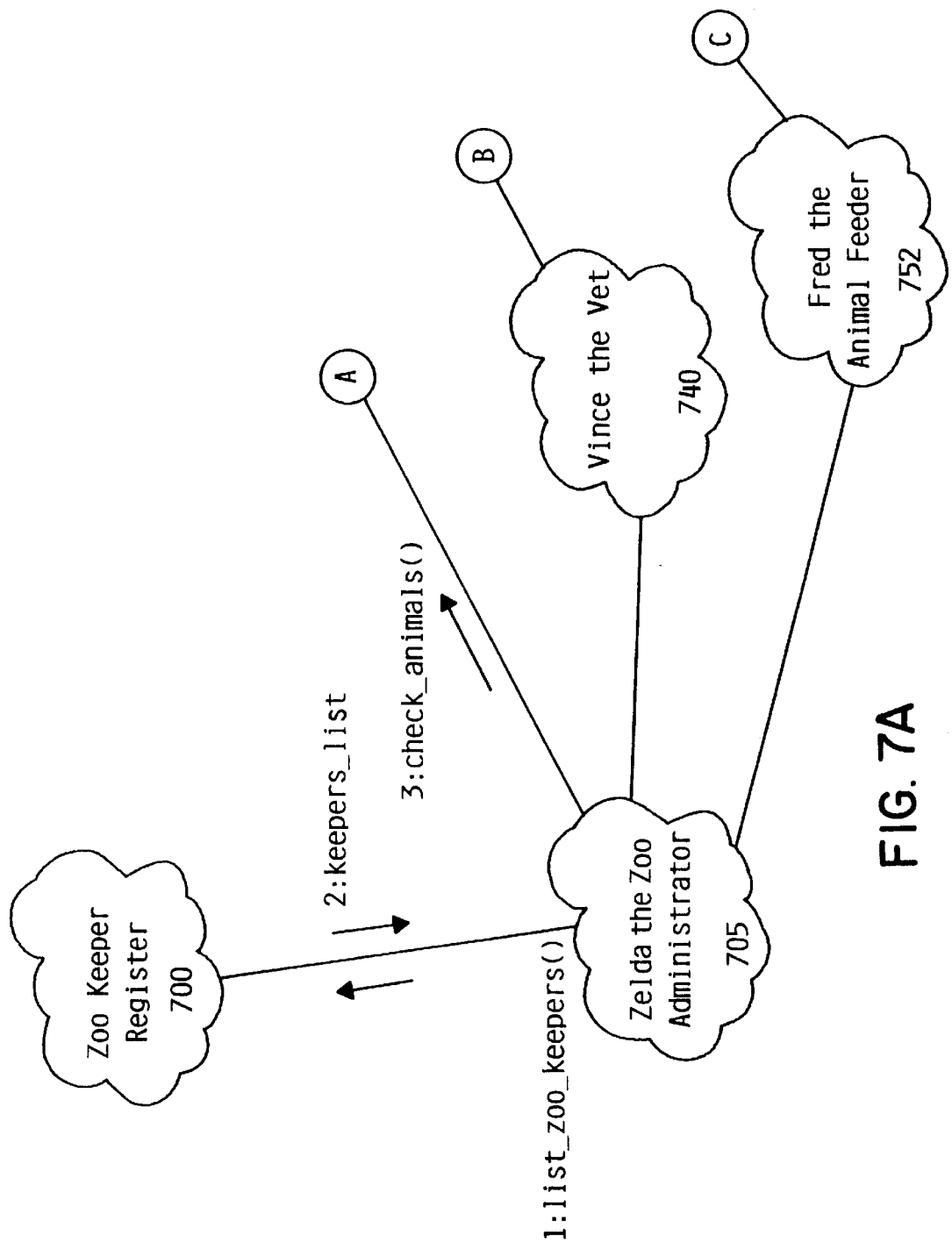
FIG. 7 is an object diagram for the example framework mechanism of FIGS. 1 through 6.
Figure 7B:
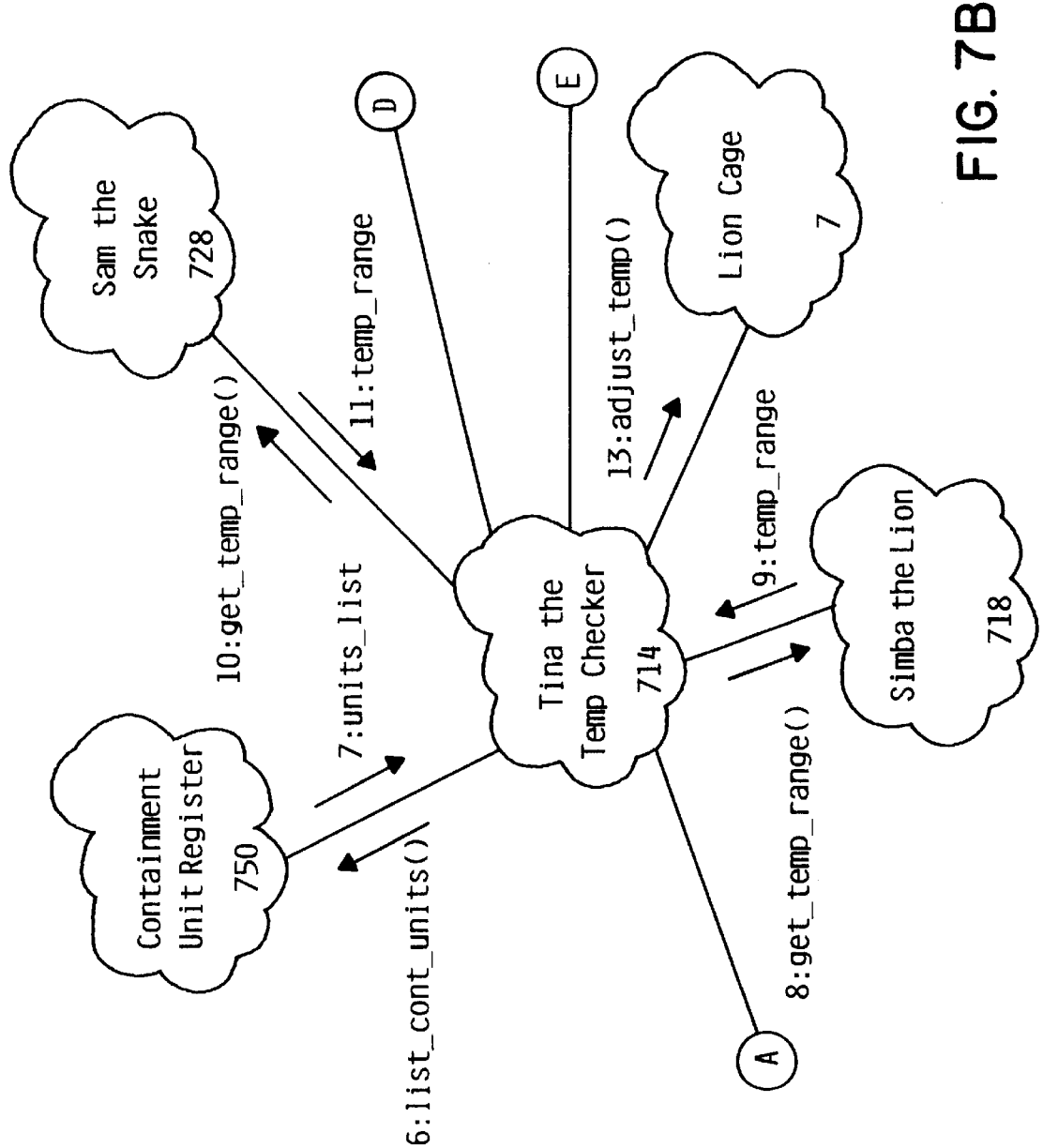
Figure 7C:
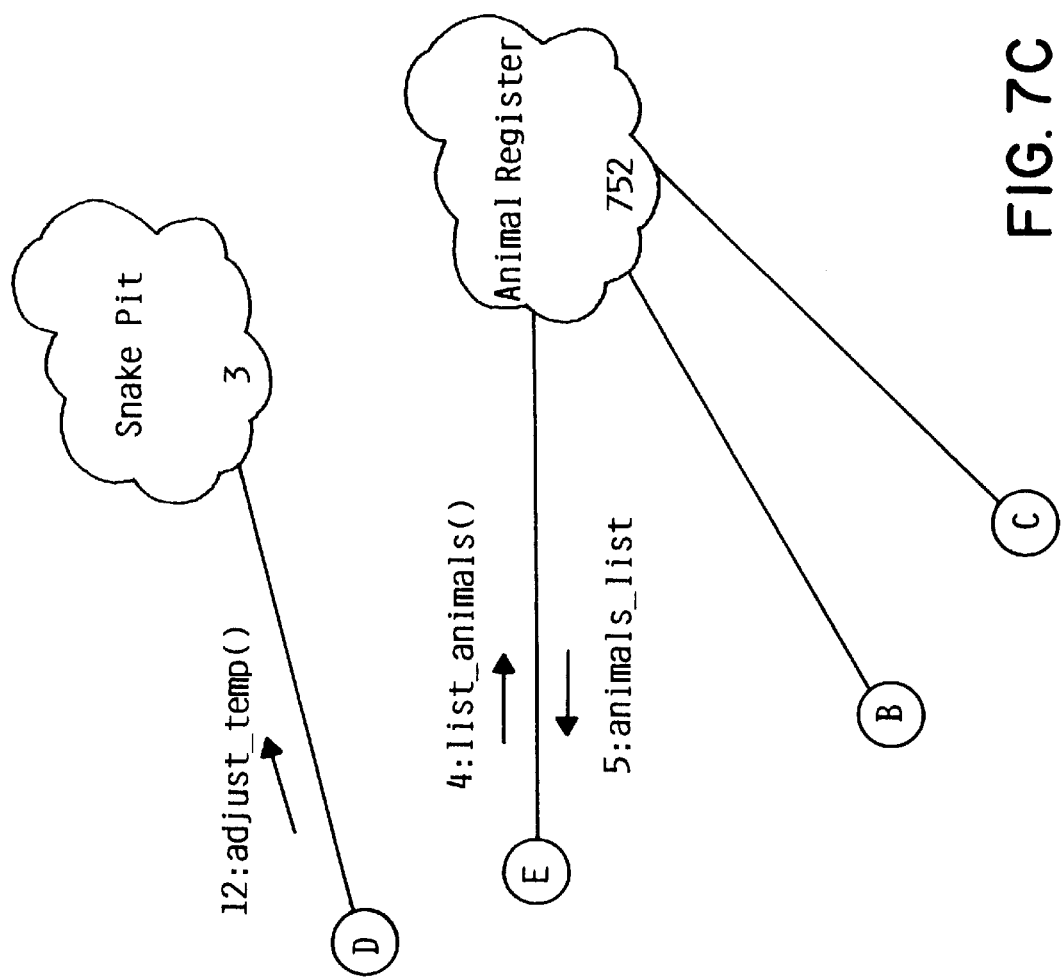

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 706] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check_animals( ) operation of each zoo keeper object [only the call to Tina the Temp. Checker is shown—step 3]. Please note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust_temp( ) operations is polymorphic. In other words, the check_animals( ) operation of object Tina does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF mechanism is an extremely simplistic framework mechanism that has been presented here to help novice readers understand some basic framework concepts so as to best appreciate the benefits and advantages of the present invention. These benefits and advantages will become more clear upon reference to the following Detailed Description.

DETAILED DESCRIPTION

Figure 8:
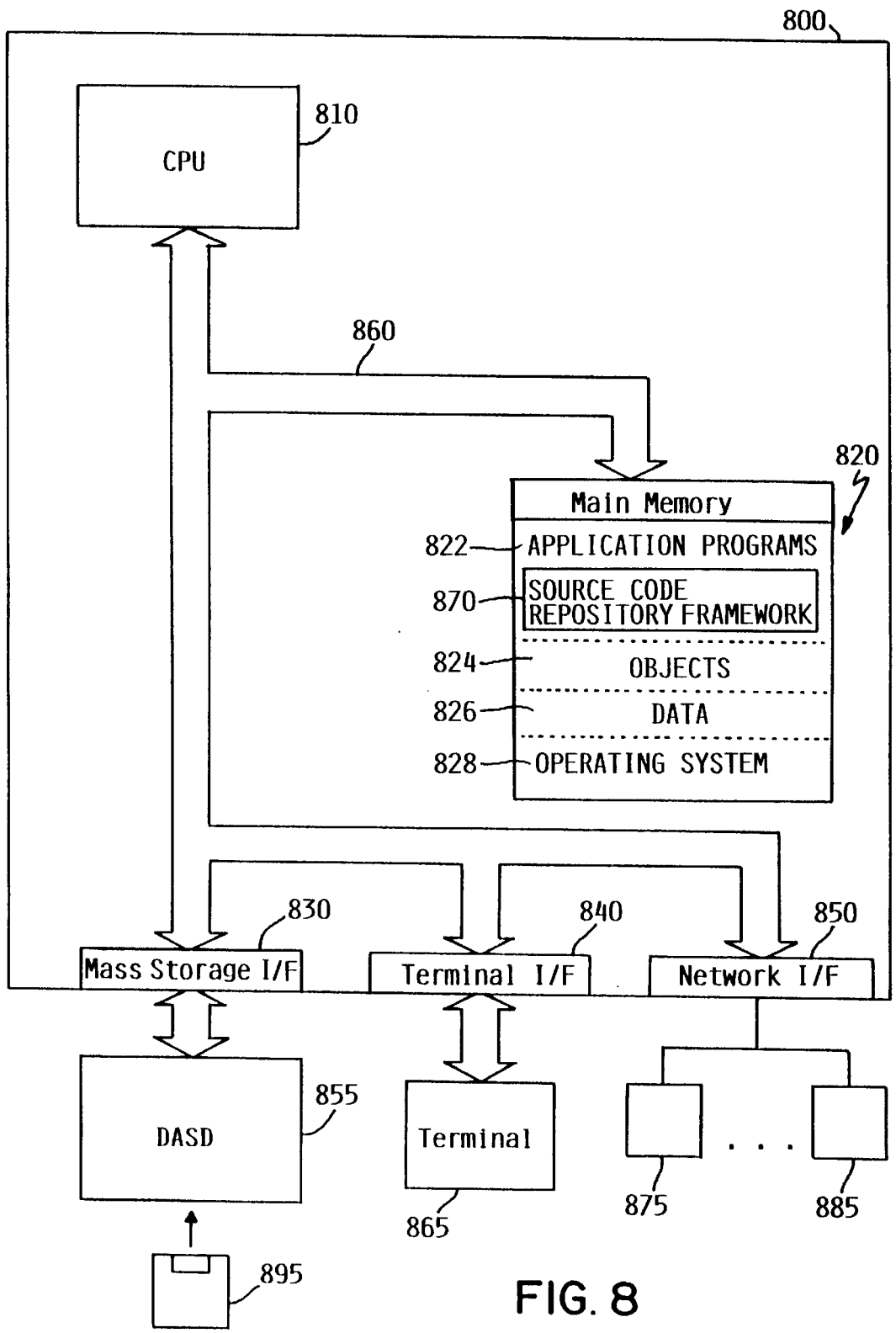
FIG. 8 is a block diagram of the computer system used in the preferred embodiment.

FIG. 8 shows a block diagram of a computer system 800 in accordance with the present invention. The computer system of the preferred embodiment is a computer system such as an AIX platform. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 8, computer system 800 comprises main or central processing unit (CPU) 810 connected to main memory 820, mass storage interface 830, terminal interface 840, and network interface 850. These system components are interconnected through the use of a system bus 860. Mass storage interface 830 is used to connect mass storage devices (such as DASD device 855) to computer system 800. One specific type of DASD device is a floppy disk drive, which may store data to and read data from a floppy diskette 895.

Main memory 820 contains application programs 822, objects 824, data 826, and an operating system 828. Computer system 800 utilizes well known virtual addressing mechanisms that allow the programs of computer system 800 to behave as if they only have access to a large, single storage entity (referred to herein as computer system memory) instead of access to multiple, smaller storage entities such as main memory 820 and DASD device 855. Therefore, while application programs 822, objects 824, and operating system 828 are shown to reside in main memory 820, those skilled in the art will recognize that these programs are not necessarily all completely contained in main memory 820 at the same time. Note that the term "computer system memory" is used herein to generically refer to the entire virtual memory of computer system 800.

Operating system 828 is a suitable multitasking operating system such as AIX; however, those skilled in the art will appreciate that the spirit and scope of the present invention is not limited to any one operating system. Operating system 828 preferably supports an object oriented programming environment such as that provided, for example, by the C++ programming language. One or more application programs 822 provide a programming environment for computer system 800, and include a source code repository framework mechanism 870, which is preferably an object oriented framework mechanism. Framework mechanism 870 contains instructions capable of being executed on CPU 810 and may exist anywhere in the virtual memory space of computer 800.

Although computer system 800 is shown to contain only a single main CPU and a single system bus, those skilled in the art will appreciate that the present invention may be practiced using a computer system that has multiple CPUs and/or multiple buses, whether contained in a single unit or distributed across a distributed processing computer system. In addition, the interfaces that are used in the preferred embodiment each include separate, fully programmed microprocessors that are used to off-load compute-intensive processing from CPU 810. However, those skilled in the art will appreciate that the present invention applies equally to computer systems that simply use I/O adapters to perform similar functions.

Terminal interface 840 is used to directly connect one or more terminals 865 to computer system 800. These terminals 865, which may be non-intelligent or fully programmable workstations, are used to allow system administrators and users to communicate with computer system 800.

Network interface 850 is used to connect other computer systems and/or workstations (e.g., 875 and 885 in FIG. 8) to computer system 800 in networked fashion. The present invention applies equally no matter how computer system 800 may be connected to other computer systems and/or workstations, regardless of whether the connection to the network is made using present-day analog and/or digital techniques or via some networking mechanism of the future. It is also important to point out that the presence of network interface 850 within computer system 800 means that computer system 800 may engage in cooperative processing with one or more other computer systems or workstations. Of course, this in turn means that the programs shown in main memory 820 need not necessarily all reside on computer system 800. For example, one or more application programs 822 may reside on another system and engage in cooperative processing with one or more programs that reside on computer system 800. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the present invention is capable of being distributed as a program product via floppy disk (e.g., 895 of FIG. 8), CD ROM, or other form of recordable media, or via any type of electronic transmission mechanism.

Source Code Repository Framework Mechanism of the Present Invention

The source code repository framework mechanism disclosed herein provides an architecture for tracking different releases of a software product. Extending the framework to accommodate a source code repository in a specific environment defines a "source code repository environment." For example, extending the framework to track software releases for a specific software application creates a source code repository environment that is tailored to the specific requirements for one particular source code repository.

By providing framework mechanism 870 within computer system 800 to track source code for a software product, a uniform programming interface for all source code repositories may be developed. Framework mechanism 870 may replace all of the proprietary source code repositories that are currently used in modern environments for tracking software configurations. This would allow a common programmer interface for virtually any type of source code repository. This common programmer interface would greatly ease the burden of programming and maintaining custom source code repositories. Thus, one of the primary benefits of the framework disclosed herein is the capability to store and track source code for many different software products using a simple, easy to use programmer interface defined by the framework.

Figure 9:
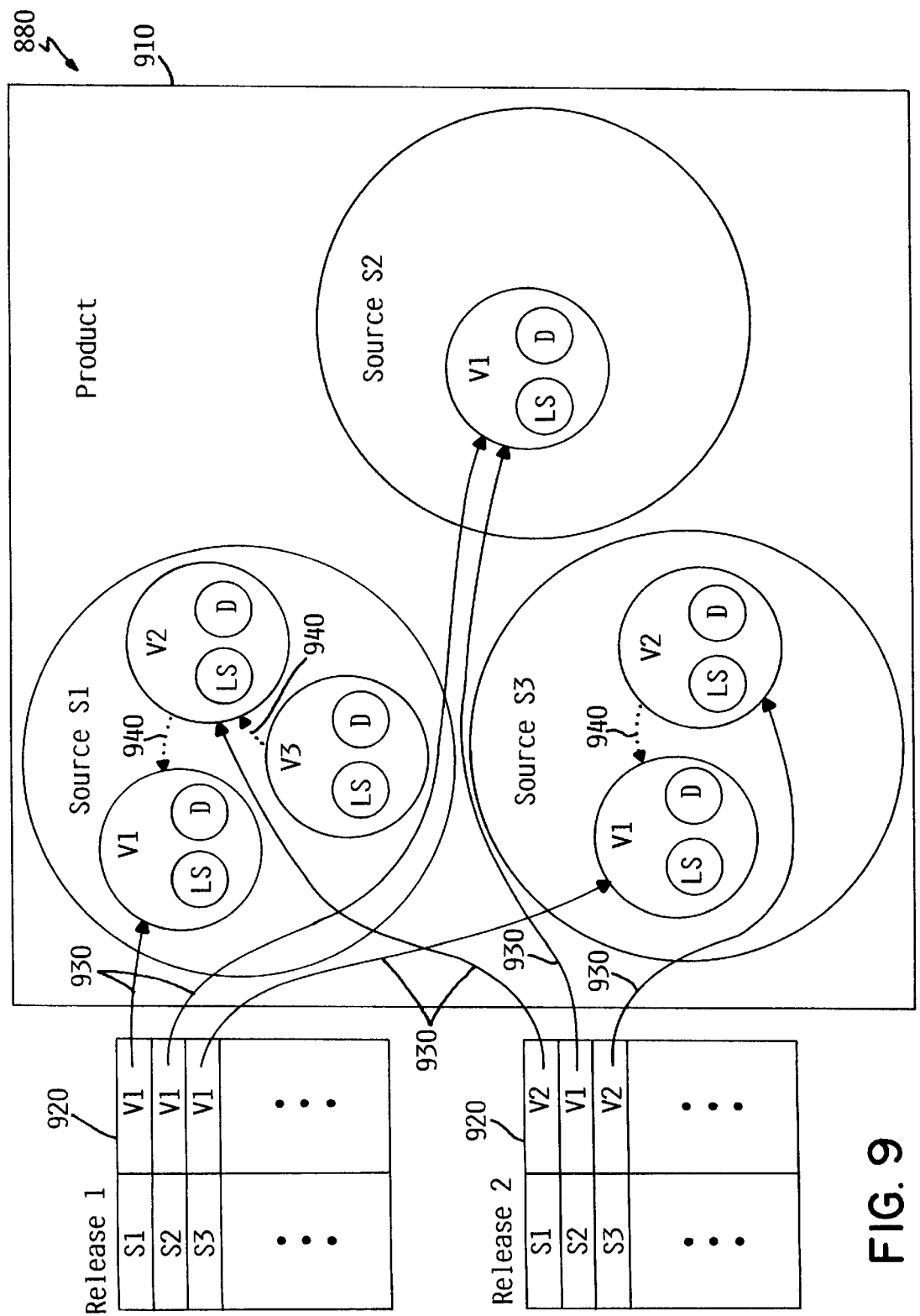
FIG. 9 is a block diagram showing the relationship between various items within the framework in accordance with the preferred embodiment.

Referring to FIG. 9, a source code repository framework in accordance with the preferred embodiment tracks different releases of a software product. The general concepts and function of the framework 870 are discussed with reference to FIG. 9 before presenting the details of the object-oriented implementation according to the preferred embodiment and best mode of the invention. Two sample releases are shown in FIG. 9, Release 1 and Release 2. The software product 910 is comprised of many software modules, only three of which are illustrated in FIG. 9. A table 920 for each release specifies which version of each source code module is needed for the release. Specifically, Release 1 requires version 1 (VI) of each source code module S1, S2 and S3. Release 2, on the other hand, requires version 2 (V2) of source code modules S1 and S3, but requires version 1 (V1) of source code module S2. A source code repository framework 870 includes storage locations for storing source code modules, as well as a variety of state and control storage locations that allow source code repository framework 870 to adequately track different releases of software product 910. Note, for example, that each version of each source code module has corresponding data D (i.e., the actual source code), and a lock state LS which is used to assure only one programmer can change a source code module at any given time.

Much of the pertinent information contained within source code repository framework 870 is illustrated graphically in FIG. 9. For example, different pointers are used in to convey the information needed for source code repository framework 870 to track the different releases of the software product. Release pointers 930 tell which version of a source module is included in the release. In addition, previous version pointers 940 are used to indicate which source code module is the previous version of a different source code module. The relationships in FIG. 9 indicate that each version of a software module has data and a lock state. Each source code module may have one or more different versions of the module. A release is made up of a predetermined combination of modules, which may include different versions.

There are some functions that source code repository framework 870 must provide to be an effective repository. These functions comprise the core function of the framework. For example, for source code repository framework 870 to be useful, a programmer needs to be able to add a new module to the repository; define which versions of which modules are included in a particular release; undo a particular version and revert back to a previous version; copy modules for creation of new modules; checkout modules for modification; checkin new modules; lock modules that have been checked out; and unlock modules when they are checked in. These are the core functions of framework 870, as described in reference to FIG. 9 below. These core functions are accomplished by creating and manipulating release tables 920, release pointers 930, and previous version pointers 940.

For the example in FIG. 9, a source code repository 880 has been created using source code repository framework 870. For this example, we first assume that Release 1 has been created, and Release 2 is now needed. With only Release 1 present, source code module S1 contains only one version V1, source code module S2 contains only one version V1, and source S3 contains only one version V1. Now, let's assume that source code modules S1 and S3 need to be changed to create Release 2. First, version V1 of source code module S1 is checked out from repository 880 using a locking and unlocking scheme. To check out a module, the lock state (LS) is checked to see if the module is locked. One suitable lock state is represented by a lock bit that indicates locked in one state and unlocked in the opposite state. If the lock bit is locked, the checkout function returns an indication that the module is locked, and that lock was therefore not attained. If the lock bit is not locked, the lock bit is set, and the checkout function returns the requested data (D) (i.e., source code) within the source code module.

V1 is checked out and modified to create V2, which is then checked back in to repository 880. Checking in a changed version of V1 creates V2, which is linked to V1 with a previous version pointer 940. Version V2 of source code module S3 is created in similar fashion. Each new version that is created has previous version pointers 940 pointing to their respective V1s.

Now a release table 920 for Release 2 is created. To simplify the creation of the new release table, a copy of the Release 1 table is made, and then modified to accommodate the configuration of Release 2. In this case, the copy of Release 1 must be modified to reflect that source code module S1 and source code module S3 have version pointers pointing to version V2. Release table 920 for Release 2 contains release pointers to all versions that are included in the release.

Let's now assume that a new release is needed that requires a new version V3 of source code module S1, and uses version V1 of source code module S2 and uses version V2 of source code module S3. To create the new version V3 of source code module S1, V2 is checked out, modified, and checked back in as V3. When the new version V3 is checked in to source code module S1, a previous release pointer 940 is added to point to the previous version V2 of source code module S1. Now let's assume that the programmer decides that version V3 of source code module S1 is not required, or needs to be deleted. Executing an undo command will cause the release pointer in the release table 920 to back up to the previous version, effectively undoing the changes from the new version. The remainder of this specification describes the operation of framework mechanism 870 as an object-oriented framework mechanism. Note, however, that the reader is referred from time to time back to FIG. 9 for a graphical illustration of the operation of framework 870.

The fact that the preferred embodiment of the framework is object oriented allows the user of the framework to easily define the needed functions by subclassing from the classes defined within the framework using known object oriented programming environments, such as C++. The preferred embodiment of the present invention is an object oriented source code repository framework. While many different designs and implementations are possible, one suitable example of an object oriented source code repository framework is disclosed below to illustrate the broad concepts of the present invention.

Class Definitions

Figure 10:
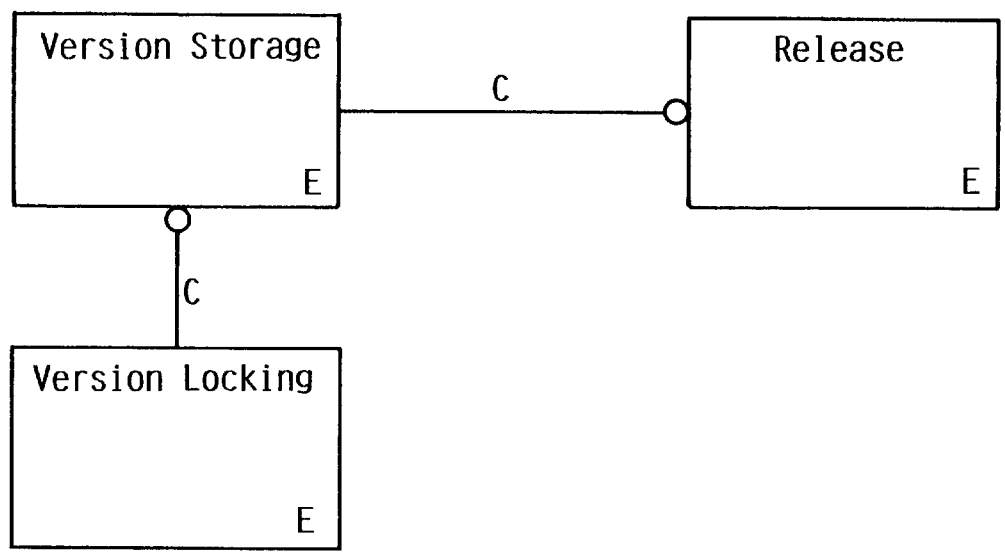
FIG. 10 is a category diagram of a framework mechanism constructed in accordance with the teachings of the preferred embodiment.
Figure 11A:
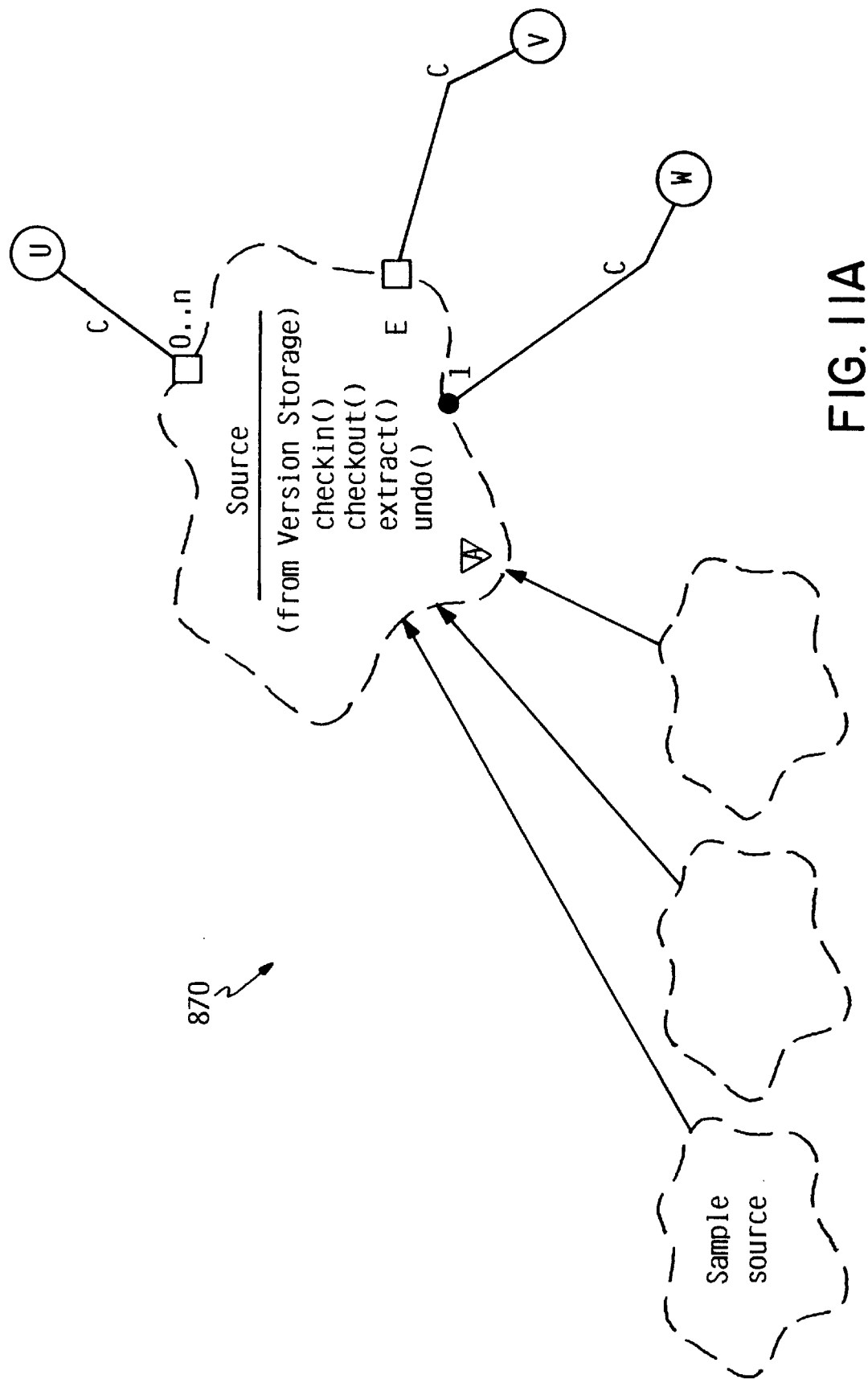
FIGS. 11–14 are class diagrams of a framework mechanism constructed in accordance with the teachings of the preferred embodiment.
Figure 11B:
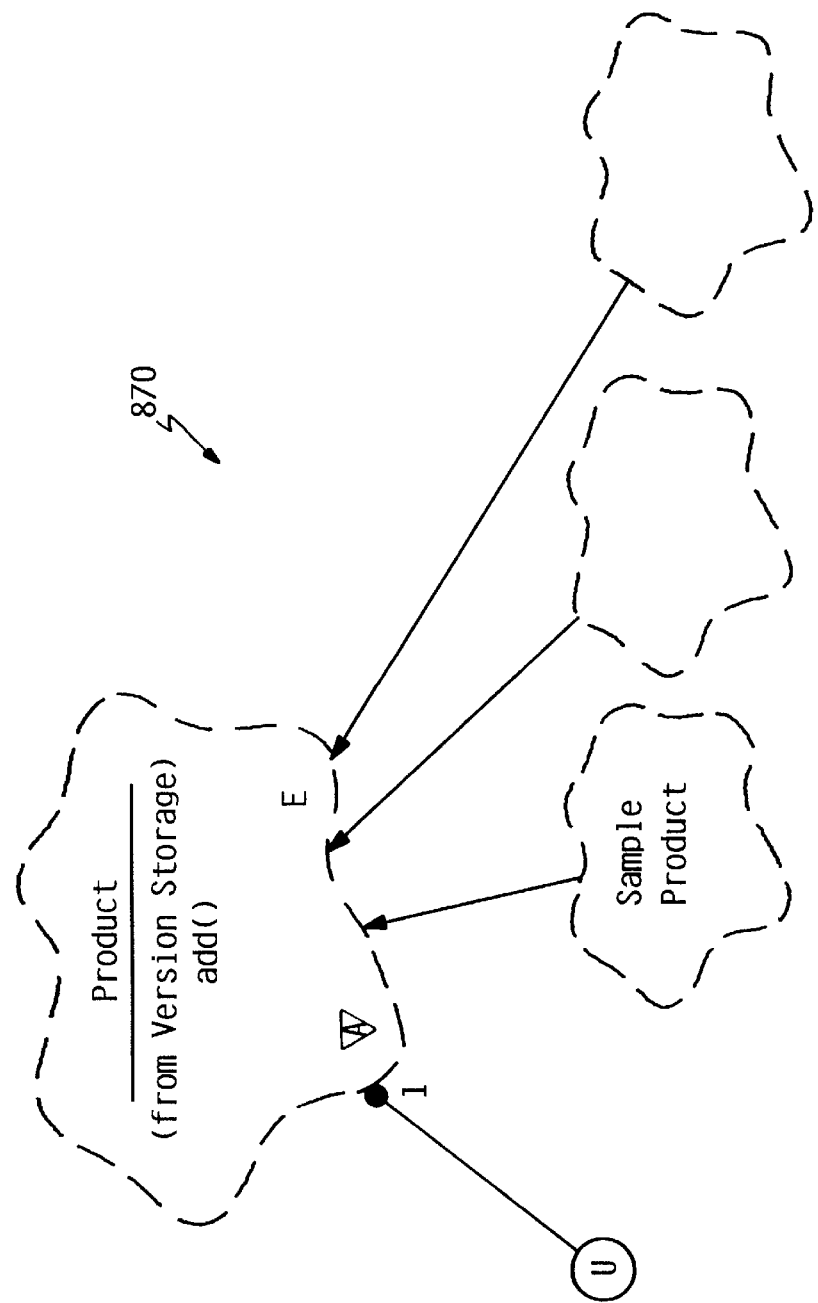
Figure 11C:
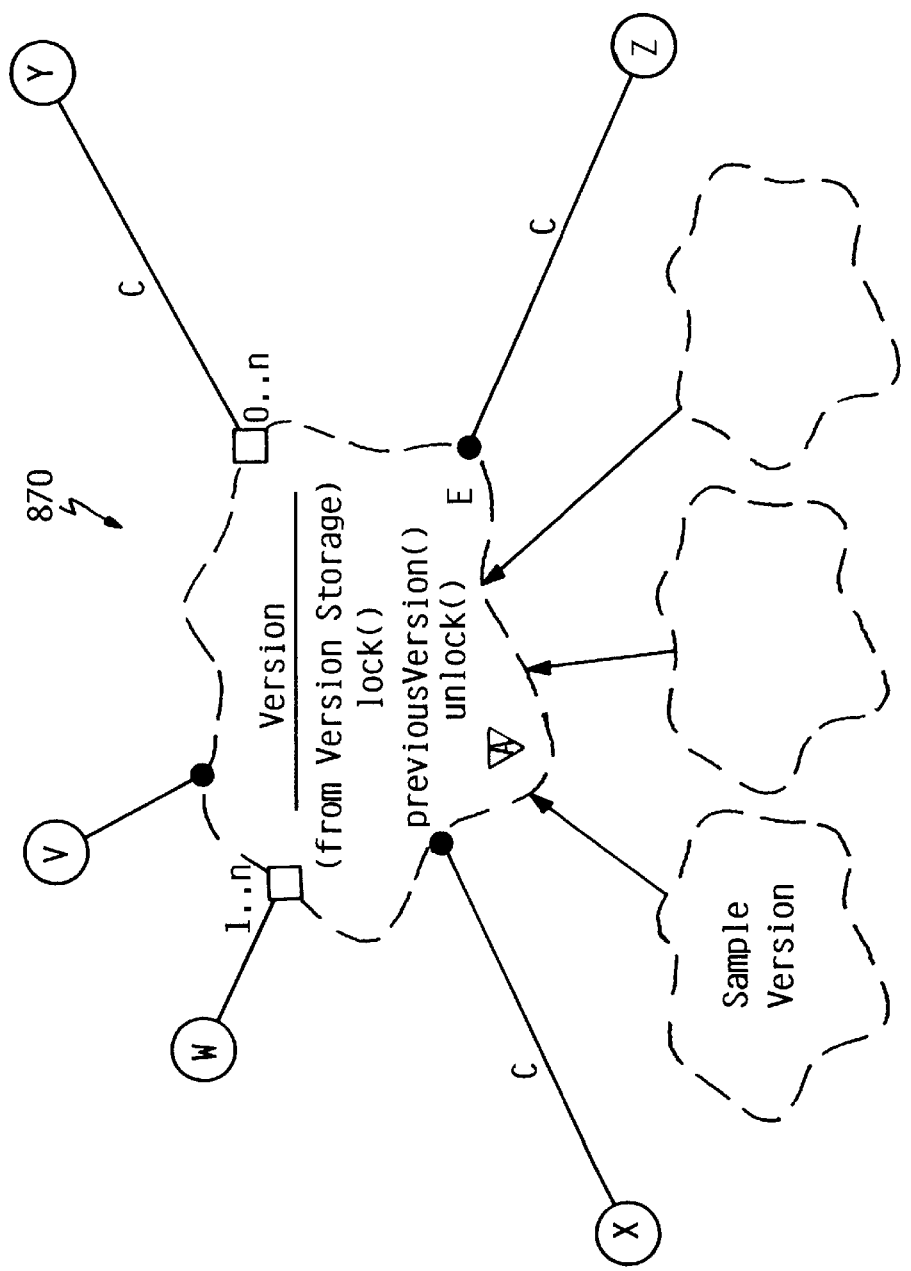
Figure 11D:
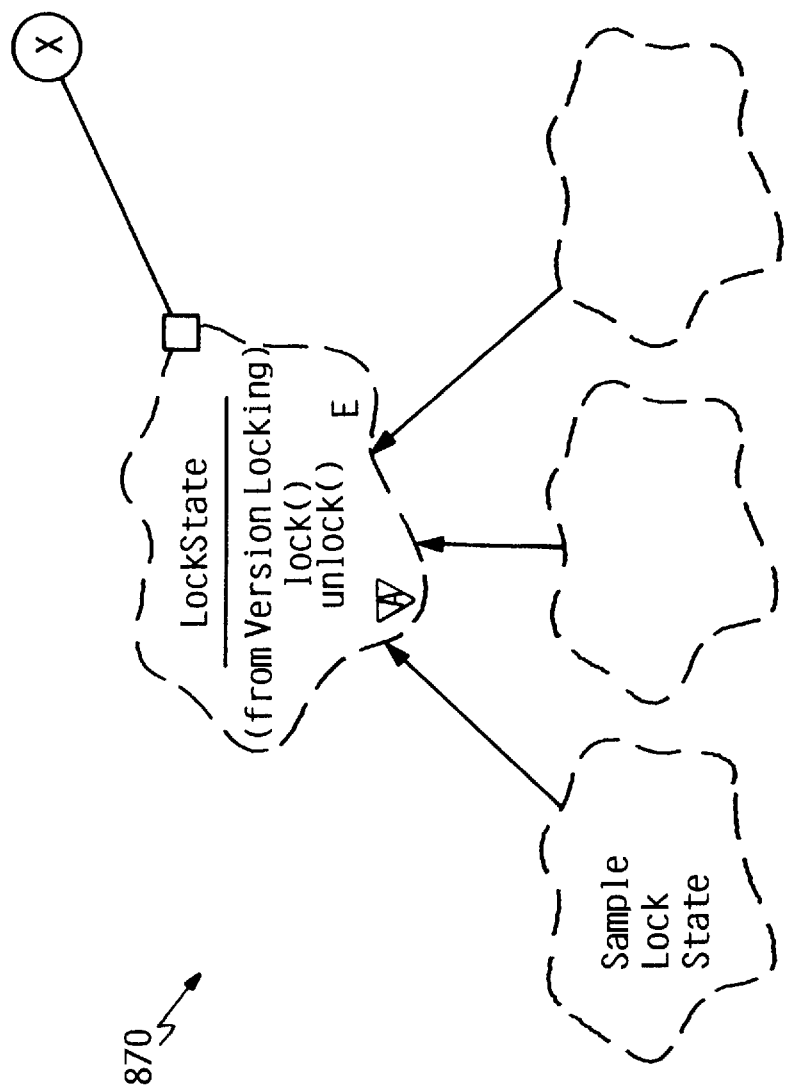
Figure 11E:
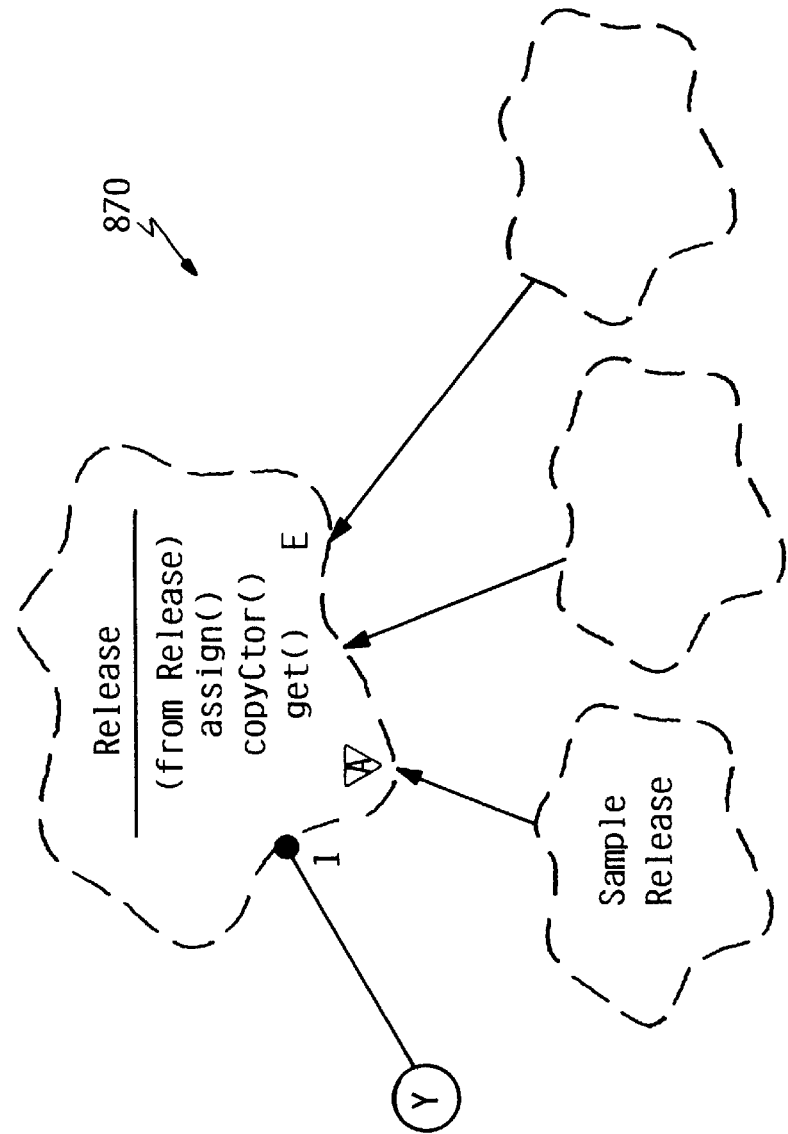
Figure 11F:
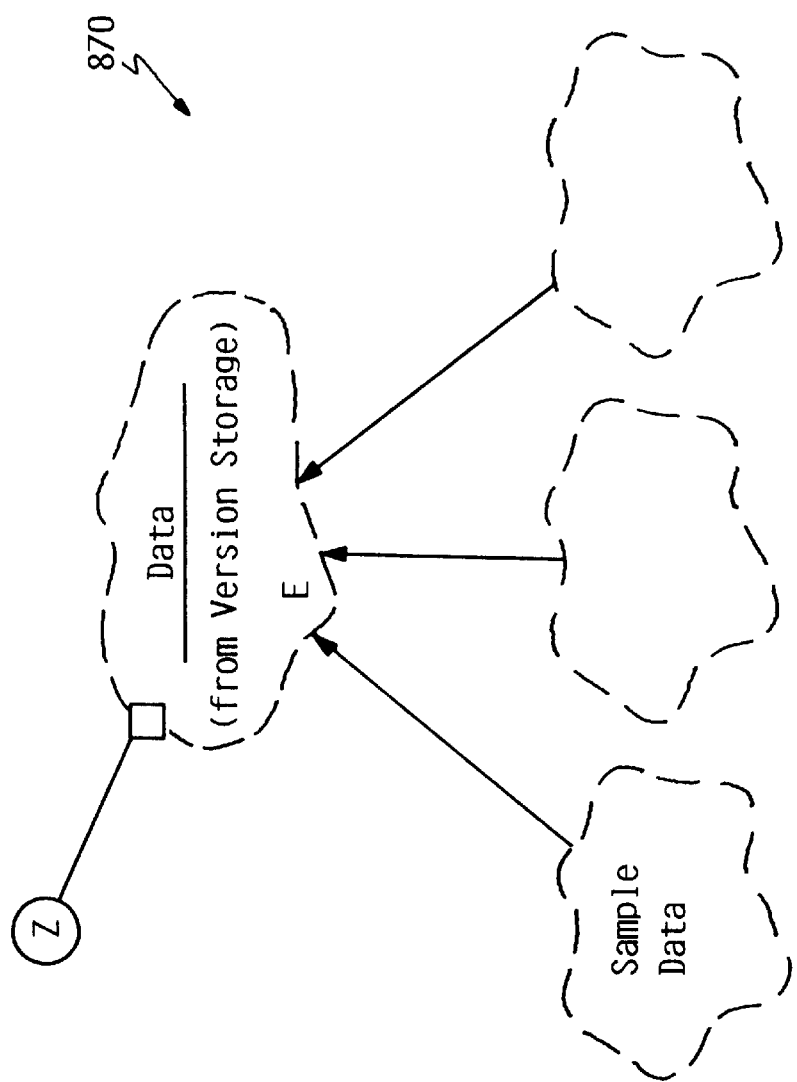
Figure 12A:
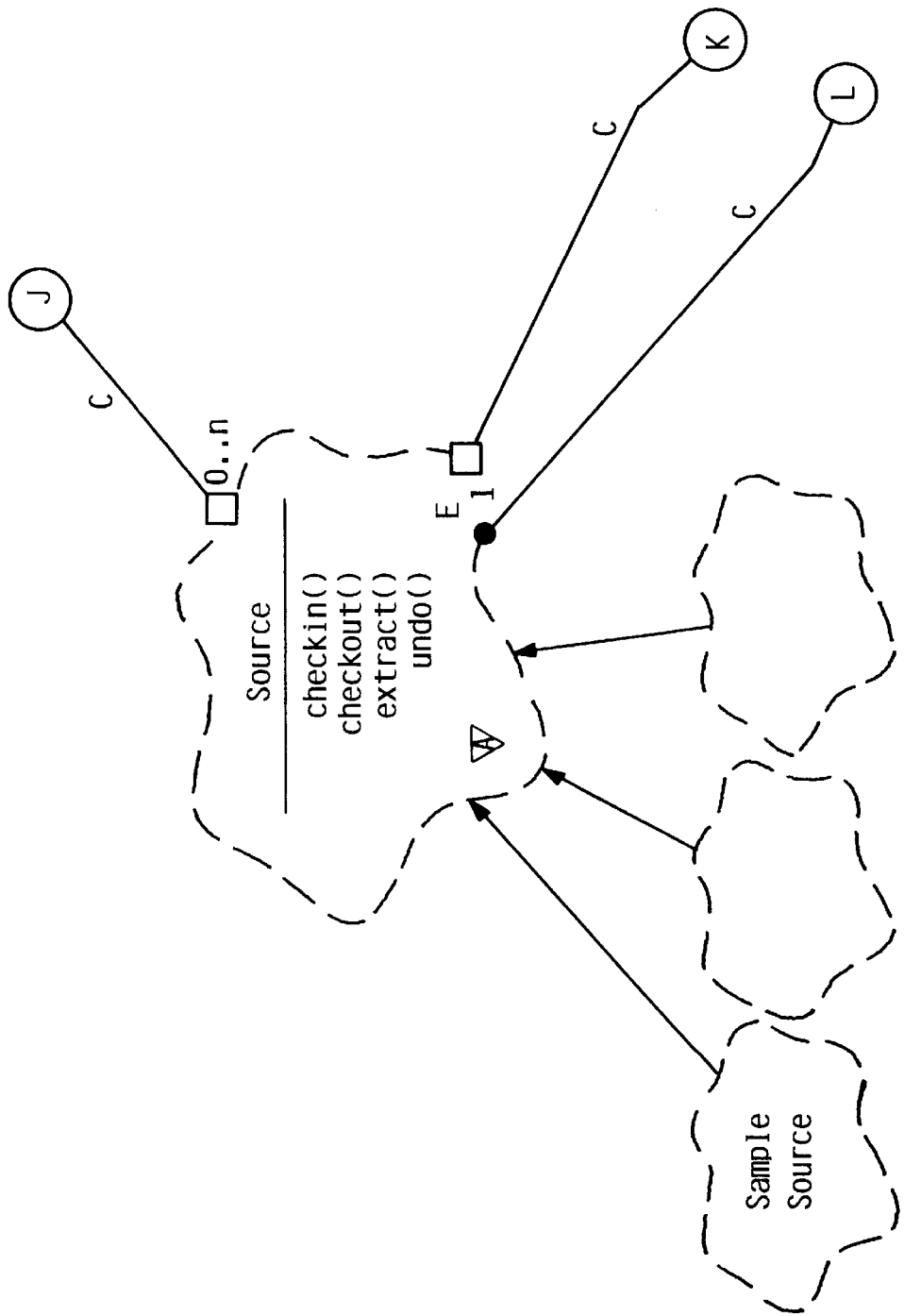
Figure 12B:
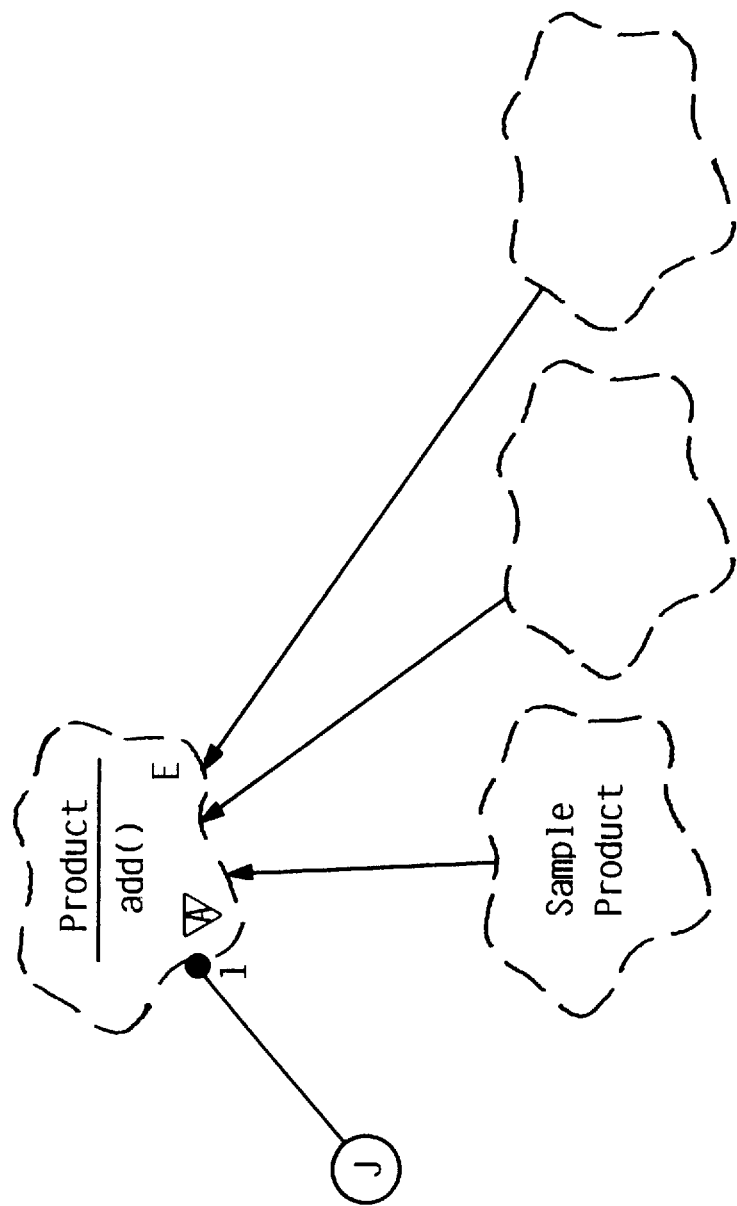
Figure 12C:
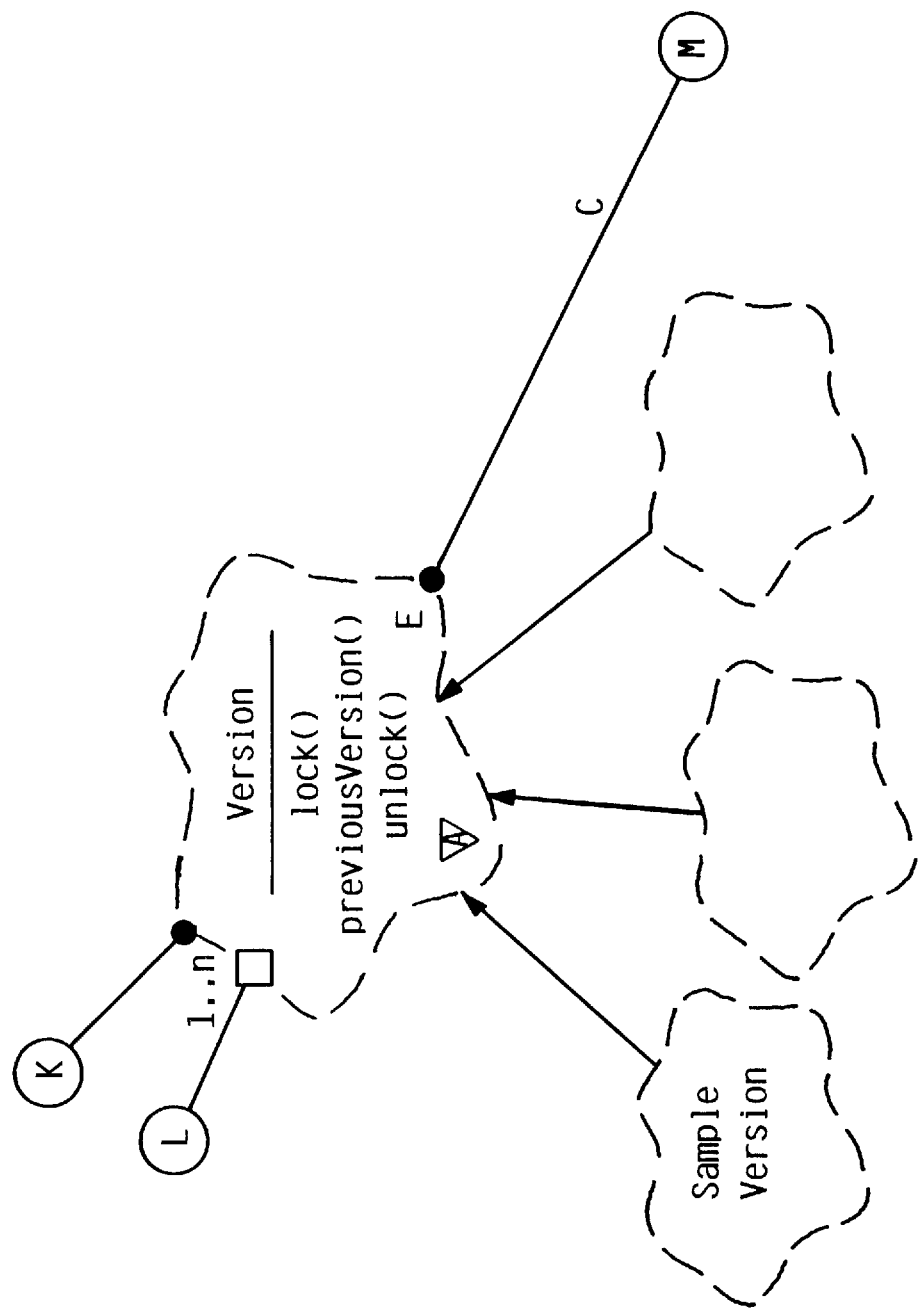
Figure 12D:
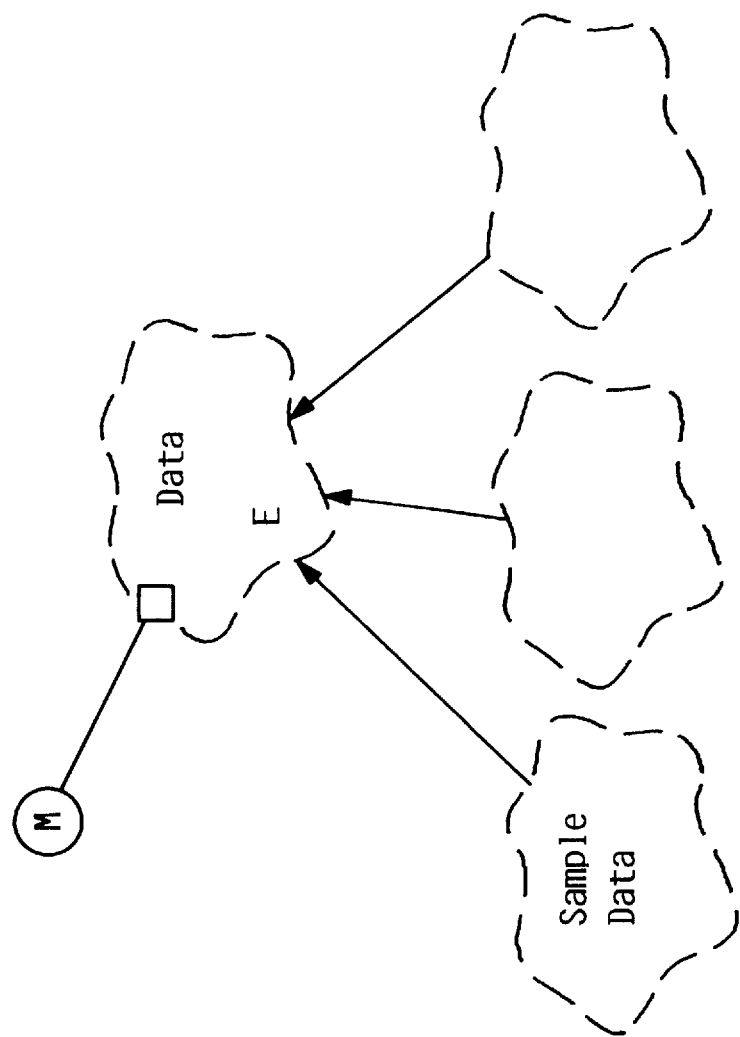

FIG. 10 is a category diagram of the source code repository framework mechanism 870 in accordance with the preferred embodiment. Those skilled in the art will appreciate that the categories illustrated in FIG. 10 represent collections of object oriented programming (OOP) classes that encapsulate data attributes and behaviors (or methods). Objects instantiated as members of these classes are stored in the main memory 820 of computer system 800. These classes may be implemented, for example, in a computer system operating environment that supports the C++ programming language.

The classes have been broken down into three categories: the Version Storage category, the Version Locking category, and the Release category. All of these categories are extensible categories (as indicated by the "E" label), meaning that users may extend the classes in these categories by defining and implementing classes that are subclasses of framework-defined classes. The Release category has a using relationship with the Version Storage category, indicating that classes within the Release category invoke the methods provided by the classes in the Version Storage category. In addition, the Version Storage category has a using relationship with the Version Locking category. Note that these relationships between categories are core relationships (as indicated by the "C" label), meaning that the framework user cannot modify these relationships.

FIG. 11 is a top level class diagram of the classes used to implement source code repository framework 870. The Release class belongs to the Release category; the Product, Source, Version and Data classes all belong to the Version Storage category; and the LockState class belongs to the Version Locking category. The key methods provided in each class are shown in FIG. 11. One example of a possible source code repository environment that a user could define by appropriate subclassing is shown by the Sample classes of FIG. 11. For example, Sample Product, Sample Source, Sample Version, Sample Release, Sample Lock State, and Sample Data are all examples of user-extended classes that define a specific source code repository environment. Many different subclasses could be defined to support a large number of source code repository environments, as illustrated by the blank subclasses of FIG. 11.

FIG. 11 illustrates the relationships between the various classes in the source code repository framework 870. Release is an extensible class that contains the methods shown. Release has a "has by reference" relationship to the Version class, indicating that a particular release may include one or more objects from the Version class. This can be seen from the release tables of FIG. 9, which each contain release pointers to versions that make up a release. The Version class has a "has by reference" relationship with the Source class, the LockState class, and the Data class. This is shown graphically in FIG. 9 by each version containing a lock state (LS) object and a data (D) object, with each version corresponding to a particular source object. The Source class has a "has by reference" relationship with the Version class, indicating that each source may have one or more versions. As seen in FIG. 9, source S1 has three different versions of S1 available. Finally, the Product class has a "has by reference" relationship to the Source class, indicating that a product may contain from any number of sources from zero to n. In the example of FIG. 9, the Product has three sources, S1, S2 and S3. All of the relationships between classes in FIG. 11 are core relationships, that a user of the framework may not alter.

The classes in FIG. 11 define a set of methods which provide the core functions needed for the framework to operate. Each of these methods correspond to functions that may be performed in interacting with a source code repository. These methods provide extensible interfaces that allow a user of the framework to take advantage of the flexibility and power of the framework by easily adapting the framework to new or different source code repository environments. The specific implementation shown in the figures for the classes are shown for the purpose of illustration, and a framework user may select alternative implementations by overriding extensible methods in the classes.

A class diagram of the classes in the Version Storage category are shown in FIG. 12. The Product, Source, Version and Data classes are all members of the Version Storage category. The Product class is an extensible abstract class. For the example of FIG. 9, the product class has three source modules, S1, S2 and S3. The Product class defines a list of all source modules that have been programmed for a given product. The Product class includes a method add ( ), which is used to add a new source module to the product.

The Source class is an extensible abstract class that includes four methods: checkin( ), checkout( ), extract( ), and undo( ). The checkin( ) method is used to check in a source module that has been recently developed or changed. The checkout( ) method is used to gain exclusive access to a source module. The extract( ) method makes a copy of a source module without checking it out. The undo( ) method causes a release to revert to the previous configuration.

The Version class is an extensible abstract class that includes three methods: lock( ), previousVersion( ), and unlock( ). The lock( ) method locks the version so another user cannot modify it. The previousVersion( ) method reverts to the previous version of the source module. The unlock( ) method unlocks the version so anybody may access it. The Data class is an extensible class that defines objects that contain the actual source code modules for the software product. Note that the relationships between these classes are core relationships, those that may not be changed by the user of the framework.

As described with reference to FIG. 11, a user of the framework may extend the framework by subclassing from the extensible classes. Thus, for the Product class in FIG. 12, a Sample Product class is shown as one example of a suitable subclass. In similar fashion, Sample Source, Sample Version, and Sample Data are suitable subclasses for the Source class, the Version class, and the Data class, respectively.

Figure 13A:
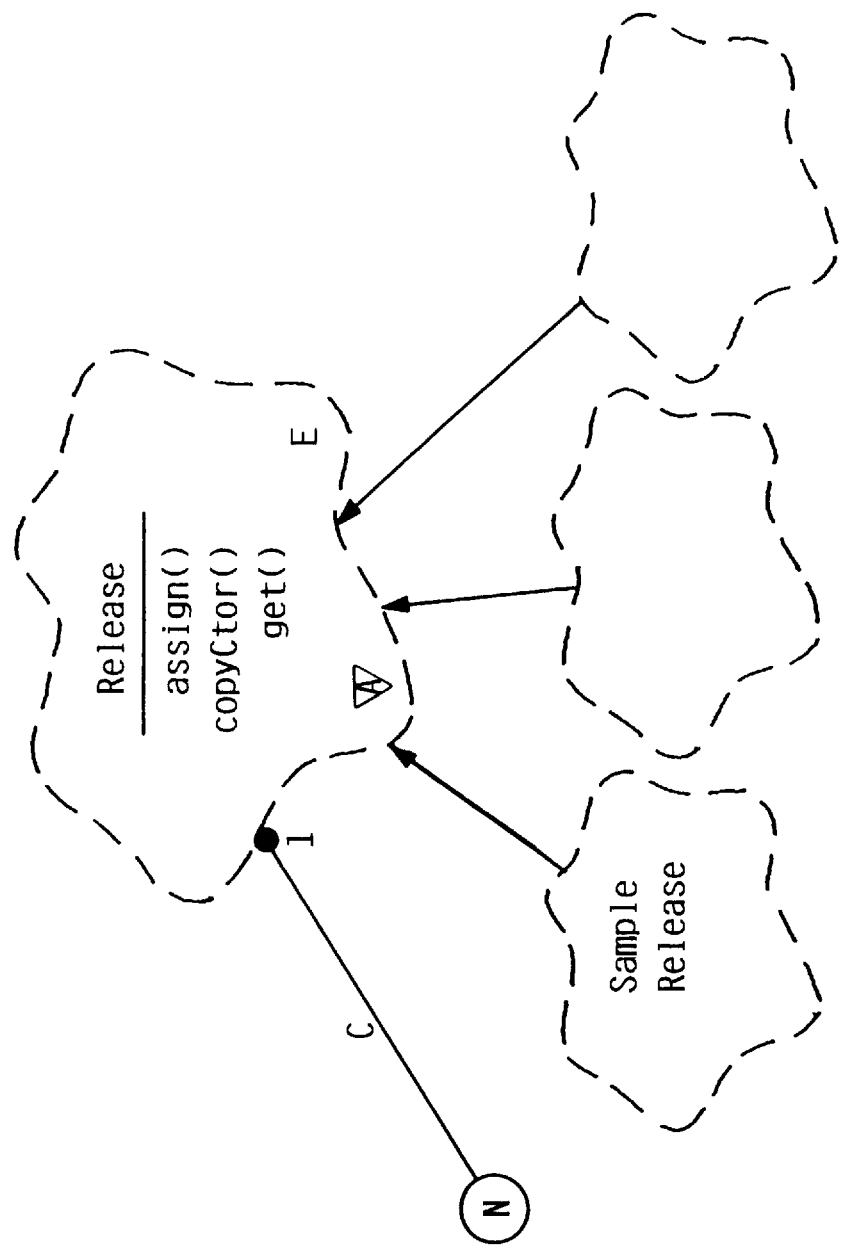
Figure 13B:
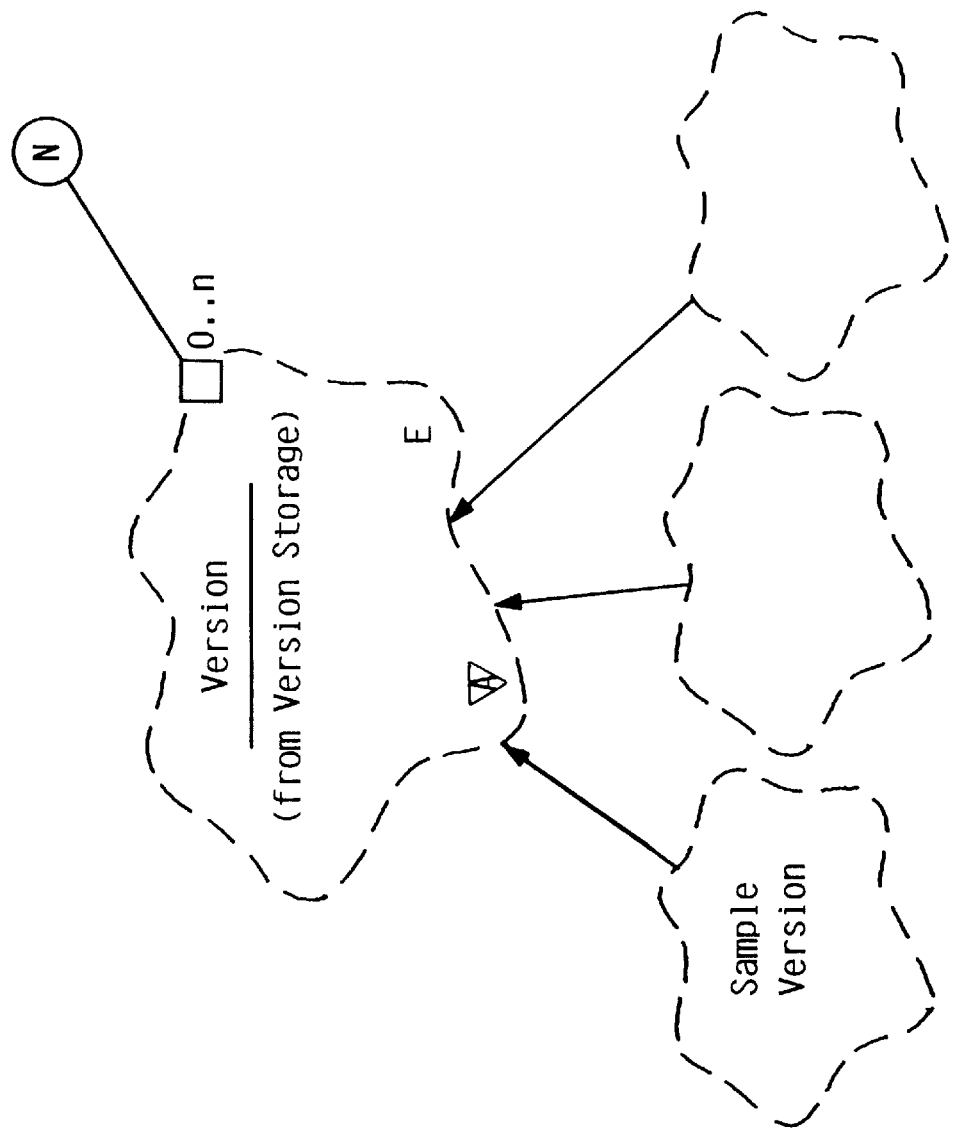

Referring to FIG. 13, the Release class is the only class in the Release category. The Release class is an extensible abstract class of the framework. The Release class has a "has by reference" relationship with the Version class (from the Version Storage category), with the 0 . . . n indicating that the release may have from zero to n versions. The Release class includes three methods: assign( ), copyCtor( ), and get( ). The assign( ) method takes a version pointer as a parameter that is passed, and returns a version pointer to the new version that is now assigned as the current version for the release. The assign( ) method is generally used during checking of a source code module. The get( ) method takes a source (e.g., S1 of FIG. 9) as a parameter that is passed, and returns a version pointer to the version corresponding to the source that was previously assigned to the release. The copyCtor( ) method is a copy constructor method, that creates a new release list based on an existing release list. In other words, a release list (e.g., 920 of FIG. 9) identical to an existing release list is created, then modified as needed to represent the new release. Note that FIG. 13 includes two sample classes, Sample Version and Sample Release, which are examples of user-defined extensions to implement a desired source repository environment.

Figure 14A:
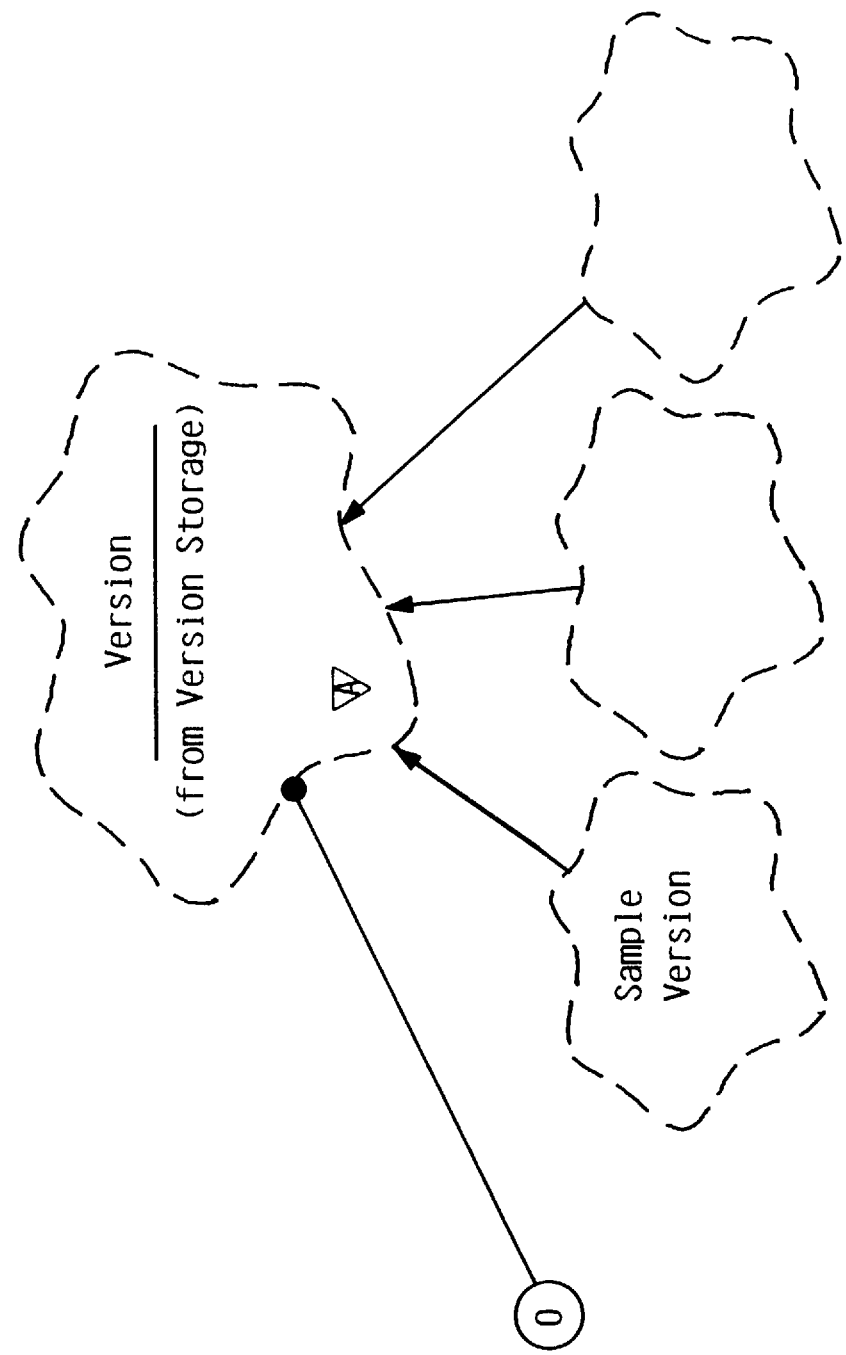
Figure 14B:
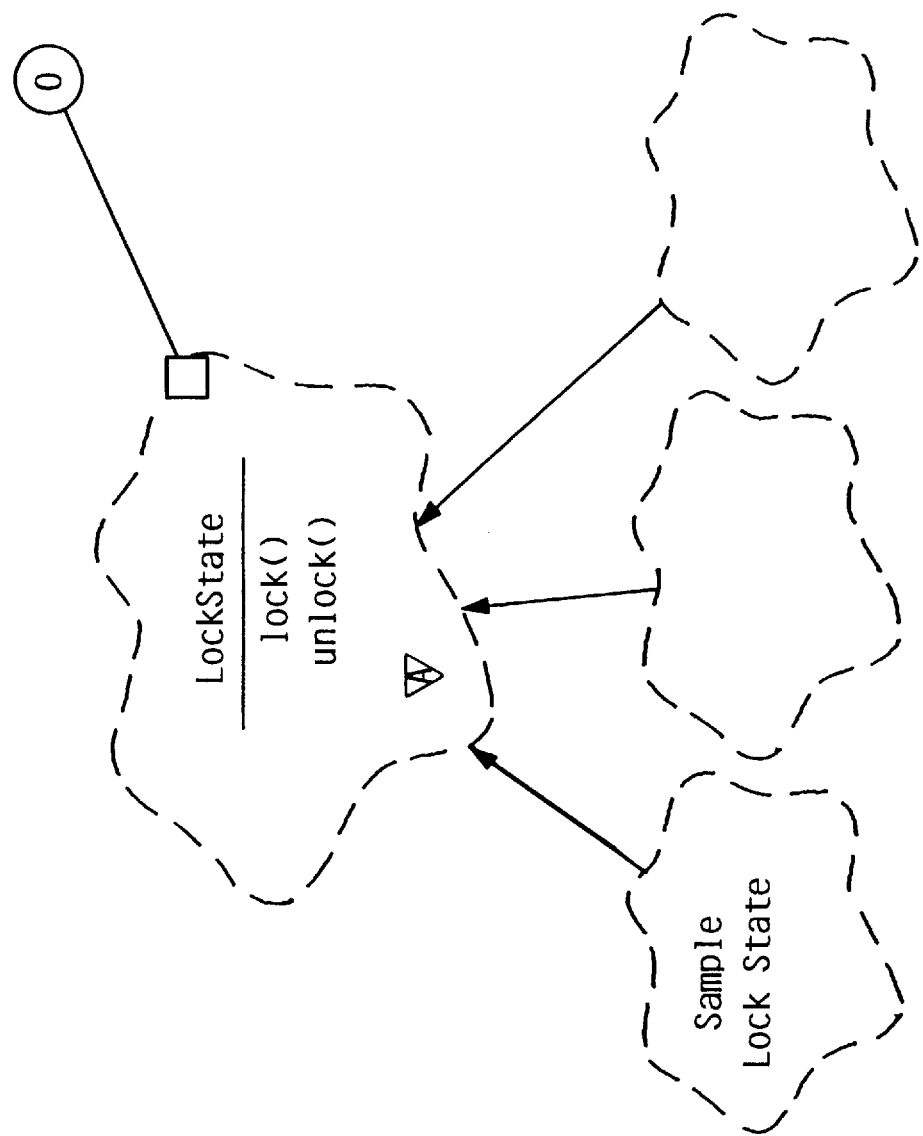

Referring to FIG. 14, the LockState class is an extensible abstract class of the framework that belongs to the Version Locking category. The Version class (from the Version Storage category) has a "has by reference" relationship with the LockState class, indicating that each version will have a corresponding lock state. The LockState class includes two methods, lock( ) and unlock( ). These methods are called by the corresponding lock( ) and unlock( ) methods of the Version class. The lock( ) method checks to see if the requested version is locked. If so, it returns an indication that the version is locked, and that lock therefore cannot be obtained. If the requested version is not locked, lock( ) changes the lock state to indicate that the version is now locked, and the requested data (e.g., the requested version of a specified source code module) is returned. In similar fashion, unlock( ) is used to unlock a version that was previously locked by a user, and is generally performed during a checkin( ) function. As illustrated by the Sample Lock State subclass of FIG. 14 (and the other unnamed subclasses), many numerous possible subclasses for LockState may be implemented. However, the one possible implementation of LockState uses a lock bit that is in one state to indicate that the module is locked, and in the opposite state to indicate that the module is not locked.

Core Functions

Core functions of source code repository framework 870 are represented by the core class relationships in conjunction with some of the methods that accomplish the core functions previously described. All class relationships shown in FIG. 11 are core relationships, and may not be modified by the user of the framework. In fact, it is the fixed character of these relationships between classes that characterizes a framework and makes it useful and powerful. The core function of the source code repository framework is defined by the core class relationships, and the functional requirements that cause the framework to behave in the desired manner. As described above with respect to FIG. 9, the core functions of the source code repository framework include: adding a new module to the repository; defining which versions of which modules are included in a particular release; undoing a version for a particular release and reverting back to a previous version for a particular release; copying modules for creation of new modules; checking out modules for modification; checking in new modules; locking modules that have been checked out; and unlocking modules when they are checked in.

Object Interaction

Figure 15A:
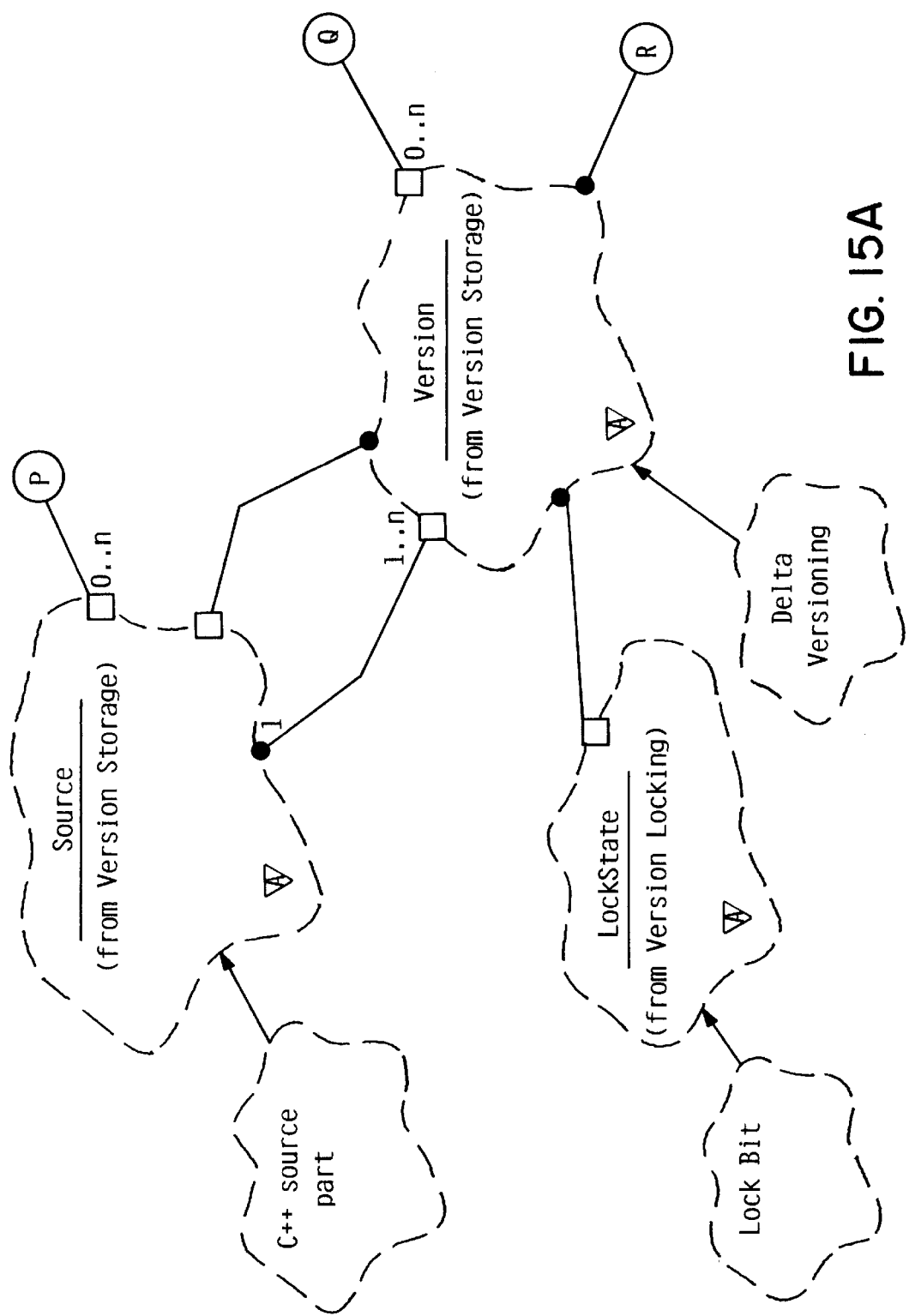
FIG. 15 is a class diagram showing the extension of the framework to implement one specific source code repository environments.
Figure 15B:
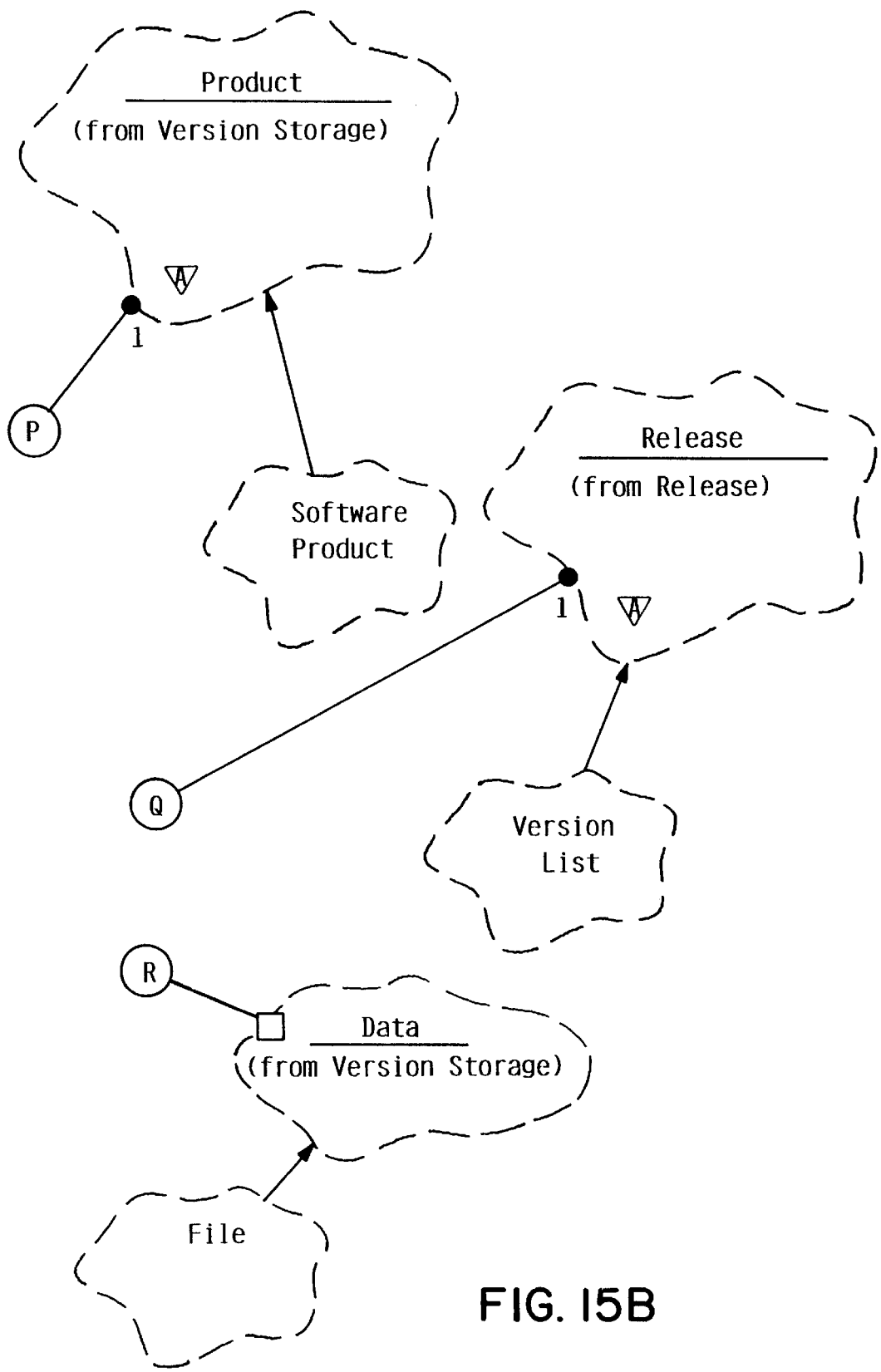
Figure 16:
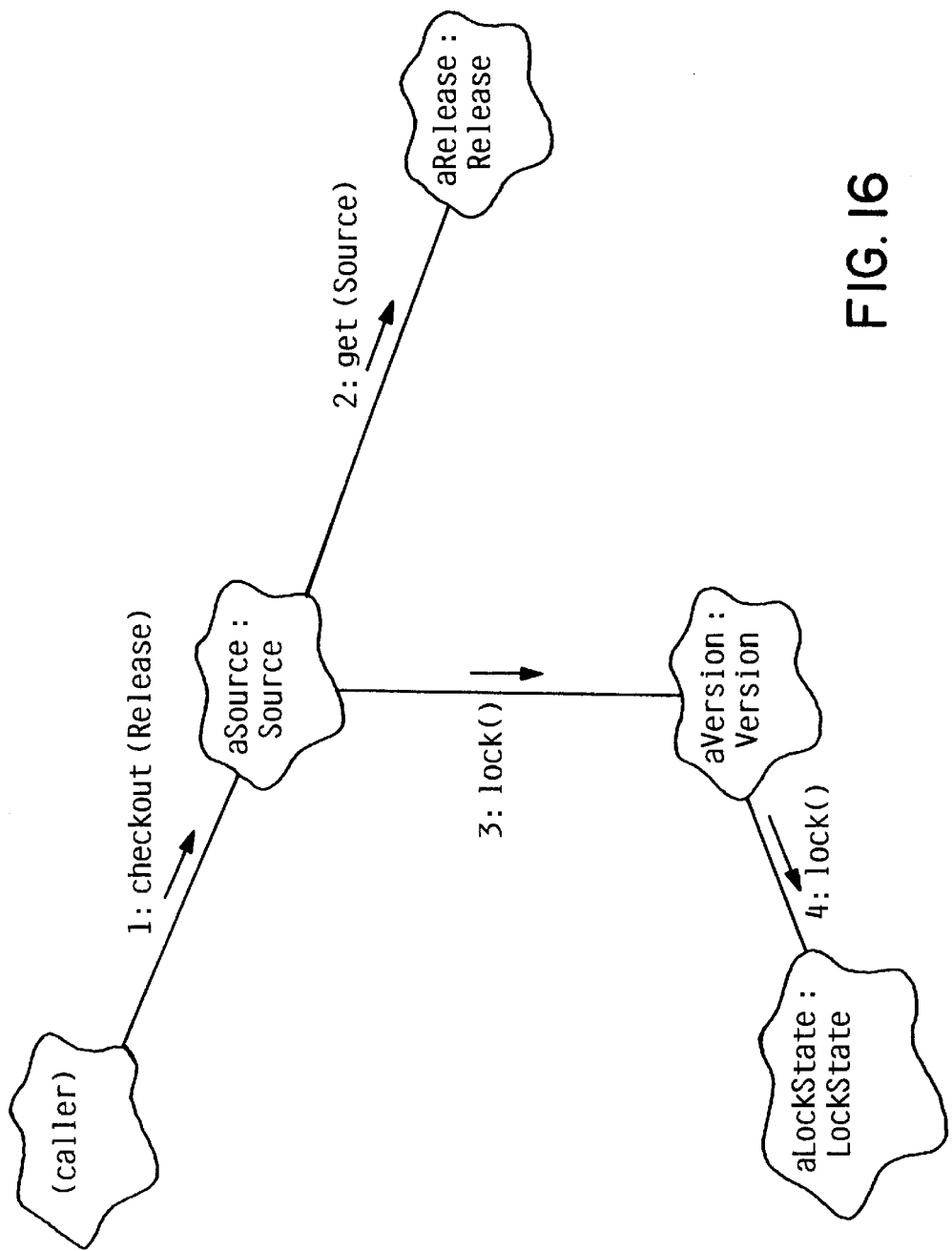
FIGS. 16–19 are object diagrams of the various methods disclosed in the class diagrams of FIGS. 11–15.
Figure 17:
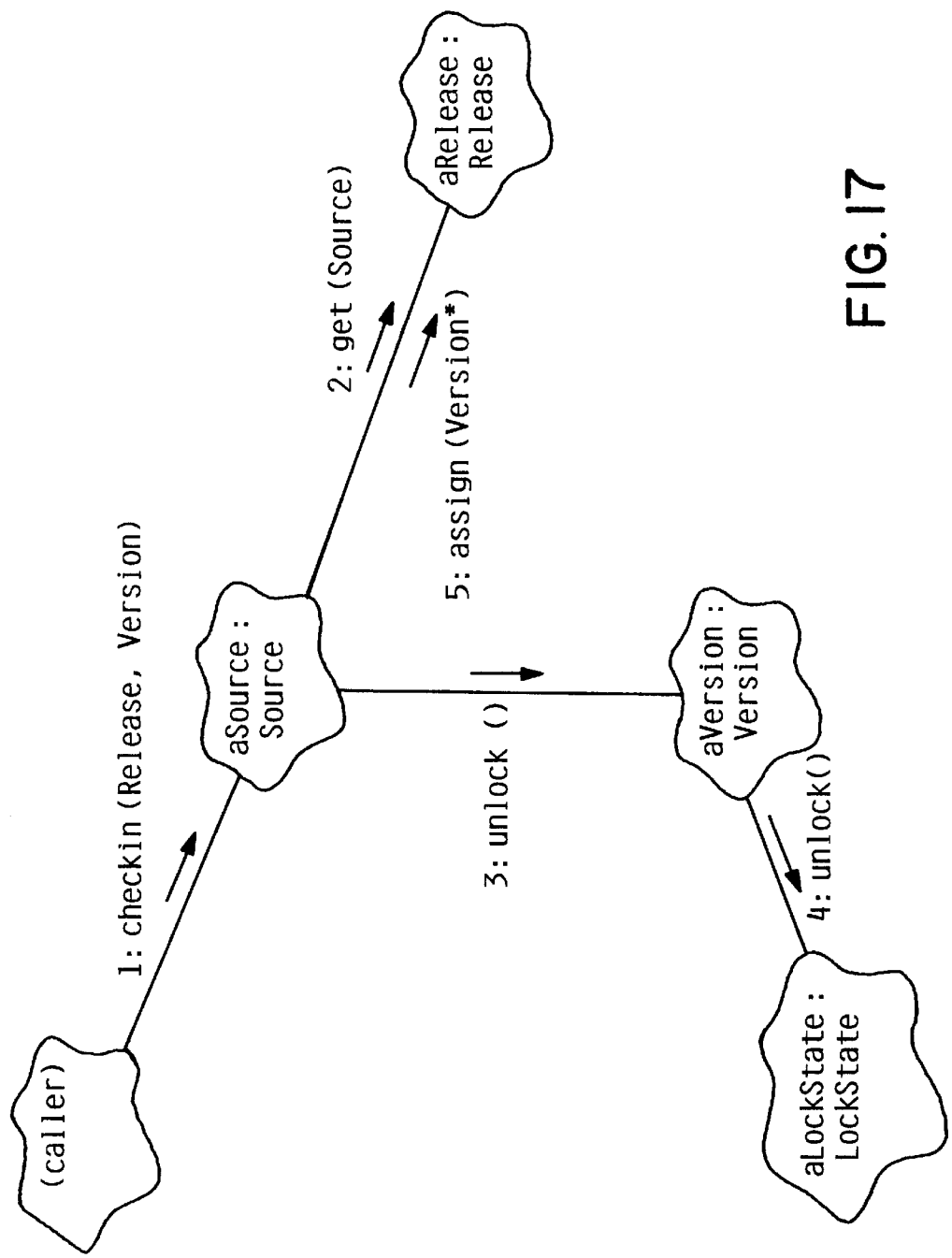

Now that the classes in the framework have been defined and the methods have been briefly presented above, we now proceed to a concrete example of how the framework 870 may be used to implement a desired source code repository environment. The operation of the framework of FIG. 11 may be best understood by the class diagram of FIG. 15 and the object diagrams of FIGS. 16–19. One specific source code repository environment is defined by subclassing from each of the following classes: Product, Source, Version, Release, LockState, and Data, as shown in FIG. 15. The framework mechanism of FIG. 15 defines a source code repository environment for tracking the configuration of a software product. The framework as extended in FIG. 15 may be used to track the various configurations for a software product. Of course, many more source code repository environments may be implemented with the framework. From this we see the power and flexibility of providing a framework for a source code repository. In sum, the framework not only makes the programmer's job easier, but it also makes the code much more portable to other applications, and makes the code much easier to maintain.

The detailed operation of framework 870 in accordance with the present invention will now be illustrated with reference to the specific source code repository environment shown in FIG. 15 and with reference to specific methods referenced in the object diagrams of FIGS. 16–19. A main program that uses the framework is represented by the caller object, which may invoke any of the methods on any Source object, namely: checkin( ), checkout( ), extract( ), and undo( ). The first of these to be considered is checkout( ), which is described in reference to the object diagram of FIG. 16.

Checkout( ) is called (step 1) when a programmer wants to change a particular version of a source code module in a particular release (e.g., S1 in Release 1 of FIG. 9). The source code module (e.g., S1 in FIG. 9) is determined by the source object (e.g., aSource in FIG. 16) that contains the checkouts method being called. The checkout( ) method is called with a Release parameter, which specifies the release of the source code module that is needed. From the release information, the version corresponding to the source code module may be determined using the get( ) method (step 2) on the specified release object (aRelease in FIG. 16). Get( ) returns the version that corresponds to the specific source and release. Next the lock( ) method of the version returned by the get( ) method is invoked (step 3), which, in turn, invokes the lock( ) method (step 4) of the corresponding lock state (e.g., aLockState in FIG. 16). The lock( ) method (step 4) checks to see if the specified version of the source is locked, and returns an indication of the lock state. If the version is already locked, the caller will know that it cannot access the version. If the version is not locked, the lock( ) method locks the aLockState object to indicate that this version is locked and cannot be changed until it is checked back in.

The next method to be discussed is checkin( ). Checkin( ) is used to check in a version that was previously checked out. Checkin( ) is called (step 1) when a programmer wants to check in a particular version of a source code module that was previously checked out (e.g., S1 in Release 1 of FIG. 9). The relevant source code module (e.g., S1 in FIG. 9) is determined by the source object (e.g., aSource in FIG. 16) that contains the checkin( ) method being called. The checkin( ) method is called with Release and Version parameters, which specify the release of the source code module and the applicable version that is being checked in. Next, the lock state must be cleared to an unlocked state. The specified source is passed as a parameter in the get( ) method (step 2) on the specified release object (aRelease in FIG. 17). Get( ) returns the pointer to the previous version so the previous version can be unlocked. This pointer is then used invoke the unlock( ) method on a previous version (step 3), which invokes the unlock method (step 4) of the lock state corresponding to the particular version (e.g., aLockState in FIG. 16). The unlock( ) method (step 4) unlocks the lock state. The last step (step 5) is to assign the release pointer from the old version to the new version by changing the version pointer in the release table (920 of FIG. 9) using the assign( ) method. Assign( ) assigns the specified version to the release by including the version in the release table at the location corresponding to the appropriate source code module.

Figure 18:
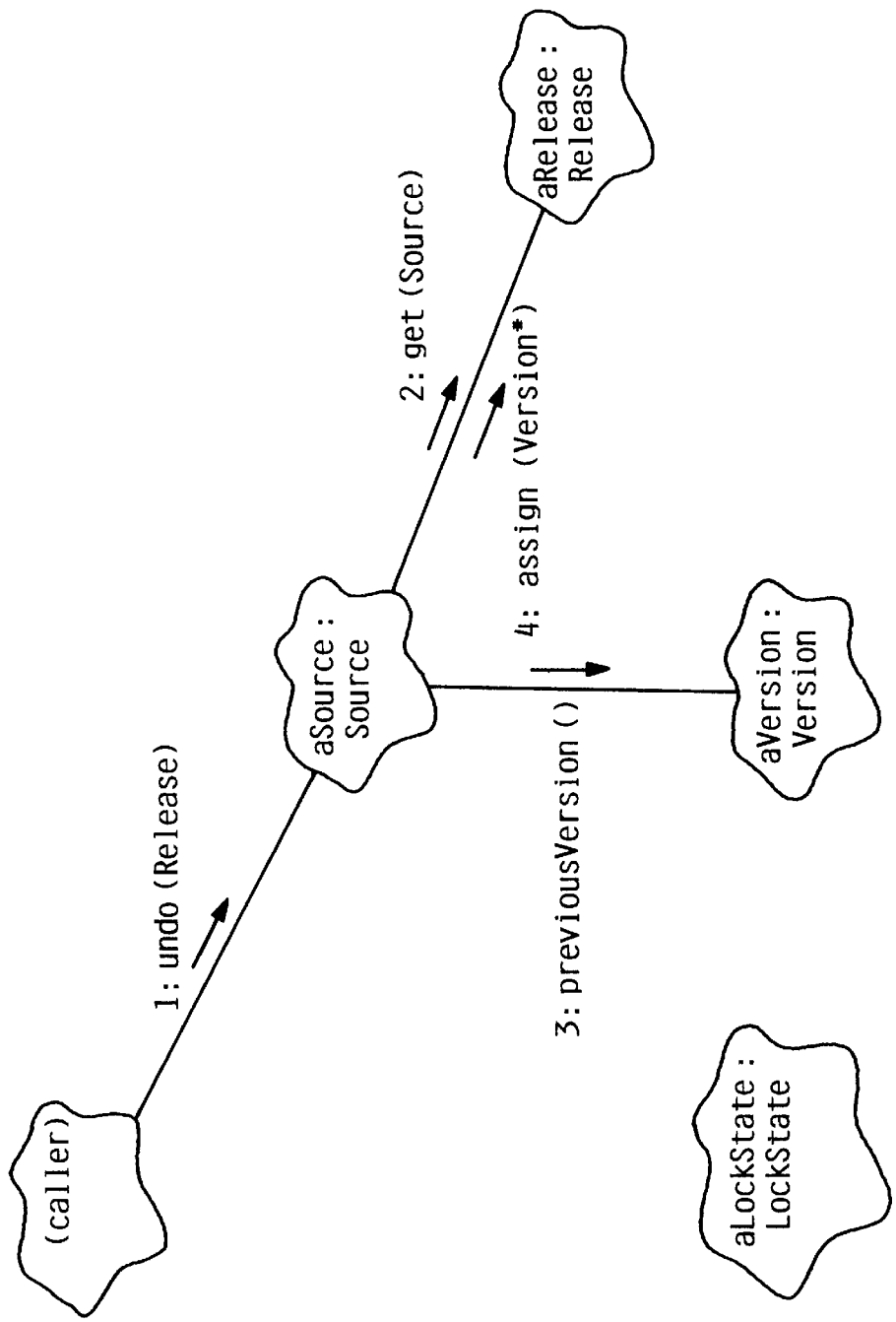
Figure 19:
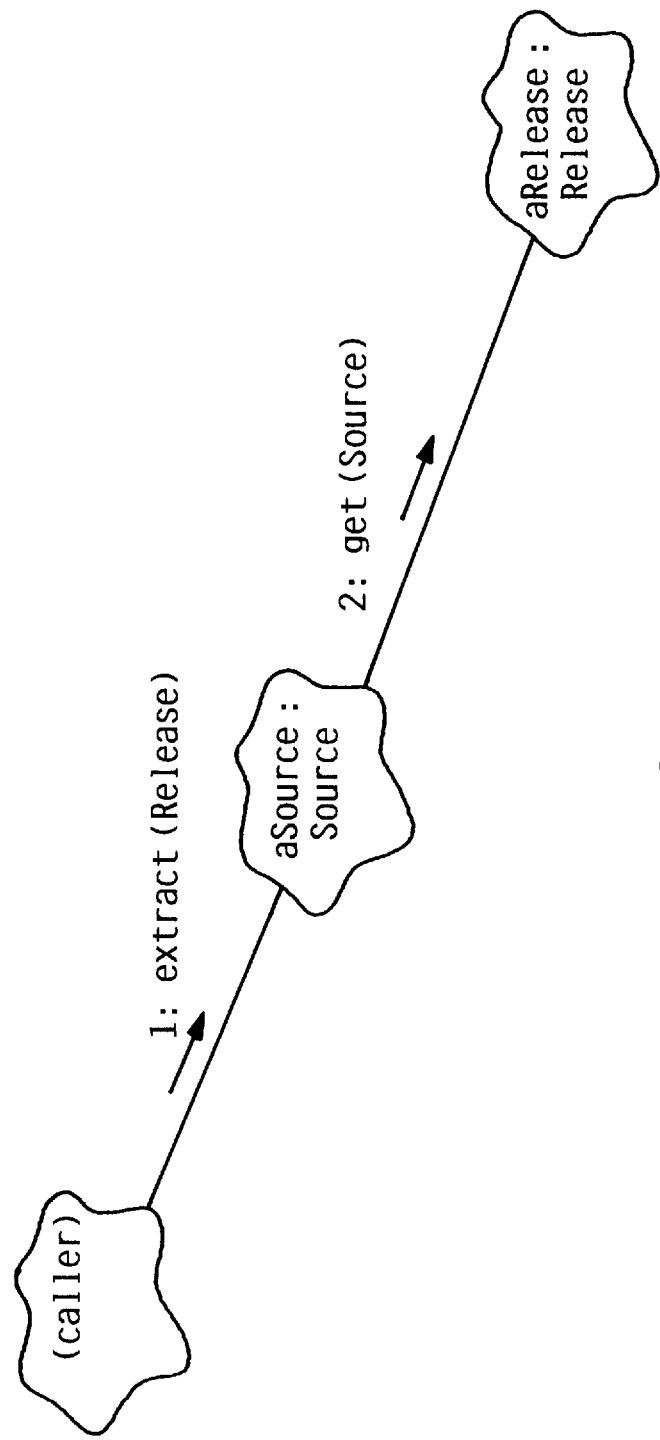

Another core function of the source repository framework 870 is accomplished with the undo( ) method, as illustrated with the object diagram of FIG. 18. The caller calls undo( ) on a specific source object and passes a specified release as a parameter (step 1). Source then invokes the get( ) method of the specified release (step 2), which returns the version pointer corresponding to the current version of the source. The previousVersion( ) method is then invoked on the corresponding version object (step 3), which returns a pointer to the previous version of the source. Finally, this version is assigned to the specified release by invoking the assign( ) method (step 4), which assigns the previous version to the specified release, thereby undoing what the checkin( ) method had done when the new version was checked in.

Finally, another core function of framework 870 is illustrated by the caller invoking the extract( ) method of a specified source object (step 1), passing a particular release as a parameter. The get( ) method of the corresponding release (e.g., aRelease of FIG. 19) is then invoked (step 2) with the particular source being passed as a parameter. The get( ) method returns the particular version corresponding to the specified source and release. Note that no locking functions are performed, as was the case for the checkout ( ) method illustrated in FIG. 16. This is because no locking functions are needed or desired, since extract( ) is a method that is used to simply copy or extract a particular version of a source code module without checking it out.

As the example above illustrates, the framework provides an extremely flexible and powerful tool for implementing any number of source code repository environments by simply defining classes that instantiate objects that implement the features specific to a particular source code repository environment. This framework mechanism allows a programmer to use a consistent programmer interface even when programming up vastly different source code repositories, and furthermore allows for a much higher degree of reusable code when compared to prior art solutions.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications,* 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labeled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams convey the same information from that conveyed by object diagrams, but simply present the same information in a different format. The present specification makes use of both object diagrams (for the ZAF example) and interaction diagrams (for the description of the invention), and those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

We claim:

1. A computer system, the computer system containing a source code repository to track at least one release for at least one software product, the computer system comprising:

a central processing unit; and a main memory coupled to the central processing unit, the main memory containing an object-oriented framework mechanism executing on the central processing unit, the framework mechanism including at least one core function that cannot be modified by a user and at least one extensible function defined by a user to customize the framework mechanism and thereby define at least one source code repository environment.

2. The computer system of claim 1 wherein the framework mechanism comprises a source class, the source class defining:

at least one source object corresponding to the at least one source code repository environment; and a first set of object methods to perform a plurality of predetermined functions to implement the source code repository environment.

3. The computer system of claim 2 wherein the first set of object methods comprises:

at least one object method that checks in a version of a source code module into the repository; and at least one object method that checks out a version of a source code module from the repository.

4. The computer system of claim 3 wherein the first set of object methods further comprises:

at least one object method that extracts a version of a source code module from the repository; and at least one object method that undoes the effect of a previous object method that checked in a version of the source code module into the repository.

5. The computer system of claim 2 wherein the source class is an extensible class of the framework mechanism, the implementation of which by a user defines a first portion of the source code repository environment.

6. The computer system of claim 1 wherein the framework mechanism comprises a product class, the product class defining:

at least one product object corresponding to a software product stored in the repository; and a second set of object methods to add a source code module to the at least one product object.

7. The computer system of claim 1 wherein the framework mechanism comprises a release class, the release class defining:

at least one release object corresponding to a release of a software product stored in the repository; and a third set of object methods to assign a specified version to the at least one release object and to identify a version specified in the release object for a specified source object.

8. The computer system of claim 1 wherein the framework mechanism comprises a version class, the version class defining:

at least one version object corresponding to a specified version of a source code module stored in the repository; and a fourth set of object methods to determine the previous version of the source code module based on the current version.

9. The computer system of claim 1 wherein the framework mechanism comprises a data class and a lock state class, the data class defining:

at least one data object representing at least one source code module that is stored in the source code repository; the lock state class defining:

at least one lock state object corresponding to each data object; and a fifth set of object methods for locking and unlocking a specified version of the at least one source code module in a corresponding data object.

10. The computer system of claim 3 wherein the framework mechanism further comprises:

a product class, the product class defining:

at least one product object corresponding to a release of a software product stored in the repository; and a second set of object methods to add a source code module to the at least one product object;

a release class, the release class defining:

at least one release object corresponding to a release of a software product stored in the repository; and a third set of object methods to assign a specified version to the at least one release object and to identify a version specified in the release object for a specified source object;

a version class, the version class defining:

at least one version object corresponding to a specified version of a source code module stored in the repository; and a fourth set of object methods to determine the previous version of the source code module based on the current version;

a data class, the data class defining:

at least one data object representing at least one source code module that is stored in the source code repository;

a lock state class, the lock state class defining:

at least one lock state object corresponding to each data object; and a fifth set of object methods for locking and unlocking a specified version of the at least one source code modules in a corresponding data object.

11. The computer system of claim 10 wherein the source class, the product class, the release class, the version class, the data class, and the lock state class are extensible classes of the framework mechanism, the implementation of which by a user defines the at least one source code repository environment.

12. The computer system of claim 10 wherein the source class has a "has by reference" relationship with the version class, the product class has a "has by reference" relationship with the source class, the release class has a "has by reference" relationship with the version class, and the version class has a "has by reference" relationship with the source class, the lock state class, and the data class.

13. The computer system of claim 1 wherein the main memory contains an application program that supports an object oriented programming environment containing the framework mechanism, and wherein the framework mechanism is extended by providing information that implements the at least one source code repository environment.

14. The computer system of claim 1 wherein:

the at least one core function is defined by the relationships between a plurality of classes within the framework mechanism; and the at least one extensible function is defined by at least one extensible class, wherein the implementation of the at least one extensible function is defined by the user of the framework mechanism by extending the at least one extensible class.

15. A method for tracking at least one release of at least one software product, the method comprising the steps of:

providing an extensible object oriented framework mechanism that stores and retrieves at least one source code module in a source code repository according to extended portions of the framework mechanism that are customized to provide a desired source code repository environment, the framework mechanism including at least one core function that cannot be modified by a user, the extended portions being defined by a user to customize the framework mechanism and thereby define the desired source code repository environment; and executing the object oriented framework mechanism on a computer system.

16. The method of claim 15 further comprising the step of:
extending the framework mechanism to define the desired source code repository environment.

17. The method of claim 15 further including the step of checking out at least one of the source code modules from the repository.

18. The method of claim 17 further including the step of locking the at least one source code module that is checked out of the repository.

19. The method of claim 18 wherein the step of locking the at least one source code module includes the steps of:
checking a lock state corresponding to the at least one source code module; and
if the lock state indicates that the at least one source code module is locked:
returning an indication of unsuccessful lock;
if the lock state indicates that the at least one source code module is unlocked:
locking the lock state; and
returning an indication of successful lock.

20. The method of claim 15 further including the step of checking in at least one of the source code modules into the repository.

21. The method of claim 20 further including the step of unlocking at least one source code module that is a previous version of the at least one source code module that is checked into the repository.

22. The method of claim 15 further including the step of extracting at least one of the source code modules from the repository.

23. The method of claim 15 further including the step of undoing the changes effected by a previous step of checking in at least one of the source code modules into the repository.

24. The method of claim 15 further including the step of building and maintaining a release object that has a plurality of version objects corresponding to a desired release of the software product.

25. The method of claim 15 further including the step of adding at least one source code module to the at least one release of the at least one software product.

26. A program product comprising:
an object-oriented framework mechanism for tracking at least one release of at least one software product, the framework mechanism including an extensible source code repository mechanism that stores and retrieves at least one source code module in a source code repository according to extended portions of the framework mechanism, the framework mechanism including at least one core function that cannot be modified by a user, the extended portions being defined by a user to customize the framework mechanism and thereby define at least one source code repository environment; and
signal bearing media bearing the framework mechanism.

27. The program product of claim 26 wherein the signal bearing media comprises recordable media.

28. The program product of claim 26 wherein the signal bearing media comprises transmission media.

29. The program product of claim 26 wherein the framework mechanism comprises:
a source object that has at least one version of the at least one source code module; and
a first set of object methods to perform a plurality of predetermined functions to implement the source code repository environment.

30. The program product of claim 29 wherein the first set of object methods includes:
at least one object method that checks in a version of a source code module into the repository; and
at least one object method that checks out a version of a source code module from the repository.

31. The program product of claim 29 wherein the first set of object methods includes:
at least one object method that extracts a version of a source code module from the repository; and
at least one object method that undoes the effect of a previous object method that checked in a version of the source code module into the repository.

32. The program product of claim 29 wherein the source class is an extensible class of the framework mechanism, the implementation of which by a user defines a first portion of the source code repository environment.

33. The program product of claim 26 wherein the framework mechanism comprises a product class, the product class defining:
at least one product object corresponding to a release of a software product stored in the repository; and
a second set of object methods to add a source code module to the at least one product object.

34. The program product of claim 26 wherein the framework mechanism comprises a release class, the release class defining:
at least one release object corresponding to a release of a software product stored in the repository; and
a third set of object methods to assign a specified version to the at least one release object and to identify a version specified in the release object for a specified source object.

35. The program product of claim 26 wherein the framework mechanism comprises a version class, the version class defining:
at least one version object corresponding to a specified version of a source code module stored in the repository; and
a fourth set of object methods to determine the previous version of the source code module based on the current version.

36. The program product of claim 26 wherein the framework mechanism comprises a data class and a lock state class, the data class defining:
at least one data object representing at least one source code module that is stored in the source code repository; the lock state class defining:
at least one lock state object corresponding to each data object; and
a fifth set of object methods for locking and unlocking a specified version of the at least one source code modules in a corresponding data object.

37. The program product of claim 33 wherein the framework mechanism further comprises:
a product class, the product class defining: the repository; and
a second set of object methods to add a source code module to the at least one product object;
a release class, the release class defining:
at least one release object corresponding to a release of a software product stored in the repository; and
a third set of object methods to assign a specified version to the at least one release object and to identify a version specified in the release object for a specified source object;
a version class, the version class defining:

at least one version object corresponding to a specified version of the code module stored in the repository; and a fourth set of object methods to determine the previous version of the source code module based on the current version;

a data class, the data class defining:

at least one data object representing at least one source code module that is stored in the source code repository;

a lock state class, the lock state class defining:

at least one lock state object corresponding to each data object; and a fifth set of object methods for locking and unlocking a specified version of the at least one source code modules in a corresponding data object.

38. The program product of claim 37 wherein the source class, the product class, the release class, the version class, the data class, and the lock state class are extensible classes of the framework mechanism, the implementation of which by a user defines the at least one source code repository environment.

39. The program product of claim 26 wherein the main memory contains an application program that supports an object oriented programming environment containing the framework mechanism, and wherein the framework mechanism is extended by providing information that implements the at least one source code repository environment.

40. The program product of claim 26 wherein the framework mechanism comprises:

at least one core function defined by the relationships between a plurality of classes within the framework mechanism, wherein the implementation of the at least one core function is defined by the framework mechanism and cannot be modified by a user of the framework mechanism; and at least one extensible function defined by at least one extensible class, wherein the implementation of the at least one extensible function is defined by the user of the framework mechanism by extending the at least one extensible class.

41. An object oriented framework mechanism for use in a computer system that supports an object oriented programming environment, the framework mechanism comprising:

at least one source object, the at least one source object including a first set of object methods to perform a plurality of predetermined functions to implement a source code repository environment;

at least one product object corresponding to a software product stored in the repository, the at least one product object including a second set of object methods to add a source code module to the at least one product object;

at least one release object corresponding to a release of the software product stored in the repository, the at least one release object including a third set of object methods to assign a specified version to the at least one release object and to identify a version specified in the release object for a specified source object;

at least one version object corresponding to a specified version of a source code module stored in the repository, the at least one version object including a fourth set of object methods to determine the previous version of the source code module based on the current version;

at least one data object representing at least one source code module that is stored in the source code repository; and at least one lock state object corresponding to each data object, the at least one lock state object including a fifth set of object methods for locking and unlocking a specified version of the at least one source code modules in a corresponding data object.

42. The object oriented framework mechanism of claim 41 wherein the framework mechanism comprises:

at least one core function defined by relationships between a plurality of classes that define the plurality of objects within the framework mechanism, wherein the implementation of the at least one core function is defined by the framework mechanism and cannot be modified by a user of the framework mechanism; and at least one extensible function defined by at least one extensible class, wherein the implementation of the at least one extensible function is defined by the user of the framework mechanism by extending the at least one extensible class.

43. A method for tracking at least one release of at least one software product, the method comprising the steps of:

(A) providing at least one source object, the at least one source object including a first set of object methods to perform a plurality of predetermined functions to implement a source code repository environment;

(B) providing at least one product object corresponding to a software product stored in the repository, the at least one product object including a second set of object methods to add a source code module to the at least one product object;

(C) providing at least one release object corresponding to a release of the software product stored in the repository, the at least one release object including a third set of object methods to assign a specified version to the at least one release object and to identify a version specified in the release object for a specified source object;

(D) providing at least one version object corresponding to a specified version of a source code module stored in the repository, the at least one version object including a fourth set of object methods to determine the previous version of the source code module based on the current version;

(E) providing at least one data object representing at least one source code module that is stored in the source code repository; and (F) providing at least one lock state object corresponding to each data object, the at least one lock state object including a fifth set of object methods for locking and unlocking a specified version of the at least one source code modules in a corresponding data object; and (G) executing the object oriented framework mechanism on a computer system to track the at least one release of the at least one software product.

44. The method of claim 43 further comprising the step of:

implementing the desired source code repository environment by extending the framework mechanism.

45. The method of claim 44 further comprising the steps of:

selecting at least one check-in criterion for determining at least one step to be performed during check-in; and the step of implementing the desired source code repository environment further including the step of defining the extended portions in accordance with the at least one check-in criterion.

46. The method of claim 44 further comprising the steps of:

selecting at least one check-out criterion for determining at least one step to be performed during check-out; and the step of implementing the desired source code repository environment further including the step of defining the extended portions in accordance with the selected at least one check-out criterion.

47. The method of claim 45 further comprising the steps of:

selecting at least one assigning criterion for assigning at least one version of at least one source code module to the at least one release object;

the step of implementing the desired source code repository environment further including the step of defining the extended portions in accordance with the selected at least one assigning criterion.

48. A program product comprising:
(A) an object oriented framework mechanism for tracking at least one release of at least one software product according to extended portions that are customized to provide a desired source code repository environment, the framework mechanism including:

at least one source object, the at least one source object including a first set of object methods to perform a plurality of predetermined functions to implement the source code repository environment;

at least one product object corresponding to a software product stored in the repository, the at least one product object including a second set of object methods to add a source code module to the at least one product object;

at least one release object corresponding to a release of the software product stored in the repository, the at least one release object including a third set of object methods to assign a specified version to the at least one release object and to identify a version specified in the release object for a specified source object;

at least one version object corresponding to a specified version of a source code module stored in the repository, the at least one version object including a fourth set of object methods to determine the previous version of the source code module based on the current version;

at least one data object representing at least one source code module that is stored in the source code repository; and at least one lock state object corresponding to each data object, the at least one lock state object including a fifth set of object methods for locking and unlocking a specified version of the at least one source code modules in a corresponding data object;

wherein the object oriented framework mechanism tracks the at least one release of the at least one software product according to extended portions of the framework mechanism that are customized to provide the desired source code repository environment; and (B) signal bearing media bearing the object oriented framework mechanism.

49. The program product of claim 48 wherein the signal bearing media comprises recordable media.

50. The program product of claim 48 wherein the signal bearing media comprises transmission media.

51. The program product of claim 48 wherein the source class, the product class, the release class, the version class, the data class, and the lock state class are extensible classes of the framework mechanism, the implementation of which by a user defines the at least one source code repository environment.

52. An object oriented framework mechanism for a source code repository, the framework mechanism comprising:

at least one core function defined by relationships between a plurality of classes within the framework mechanism, wherein the implementation of the at least one core function is defined by the framework mechanism and cannot be modified by a user of the framework mechanism; and at least one extensible class wherein the implementation of the at least one extensible class is defined by the user of the framework mechanism, by extending the at least one extensible class, thereby defining at least one source code repository environment.

53. The object oriented framework mechanism of claim 52 further comprising:

at least one source object, the at least one source object including a first set of object methods to perform a plurality of predetermined functions to implement the source code repository environment;

at least one product object corresponding to a software product stored in the repository, the at least one product object including a second set of object methods to add a source code module to the at least one product object;

at least one release object corresponding to a release of the software product stored in the repository, the at least one release object including a third set of object methods to assign a specified version to the at least one release object and to identify a version specified in the release object for a specified source object;

at least one version object corresponding to a specified version of a source code module stored in the repository, the at least one version object including a fourth set of object methods to determine the previous version of the source code module based on the current version;

at least one data object representing at least one source code module that is stored in the source code repository; and at least one lock state object corresponding to each data object, the at least one lock state object including a fifth set of object methods for locking and unlocking a specified version of the at least one source code modules in a corresponding data object.

54. A method for tracking at least one release of at least one software product using a computer system having a central processing unit and a main memory, the main memory having an application program that provides an object oriented programming environment, the method comprising the steps of:

(A) providing in the application program an object oriented framework mechanism that performs the tracking according to extended portions of the framework mechanism that are customized to provide a desired source code repository environment, the framework mechanism including:

a set of core functions wherein the implementation of the core functions is defined by the framework mechanism and cannot be modified by a user of the framework mechanism; and a set of extensible functions wherein the implementation of the extensible functions is defined by the user of the framework mechanism;

(B) extending the extensible functions in the framework mechanism to define particular classes having predetermined protocols and defining particular object methods that perform the tracking, the extensible functions defining the desired source code repository environment;

(C) generating an executable source code repository program by integrating together the extensible functions and the core functions; and (D) executing the executable source code repository program on the computer system to perform the tracking.

55. The method of claim 54 further comprising the steps of:

(a) checking in a version of a source code module into the repository; and (b) checking out a version of a source code module from the repository.

56. The method of claim 55 further comprising the steps of:

(c) extracting a version of a source code module from the repository; and (d) undoing the effect of a previous object method that checked in a version of the source code module into the repository.

57. A program product comprising:

an object oriented framework mechanism for tracking at least one release of at least one software product within a source code repository, the framework mechanism including at least one core function defined by relationships between a plurality of classes within the framework mechanism, wherein the implementation of the at least one core function is defined by the framework mechanism and cannot be modified by a user of the framework mechanism, the framework mechanism further including at least one extensible function defined by at least one extensible class, wherein the implementation of the at least one extensible class is defined by the user of the framework mechanism by extending the at least one extensible class, thereby defining a source code repository environment that governs the operation of the framework mechanism; and signal bearing media bearing the object oriented framework mechanism.

58. The program product of claim 57 wherein the signal bearing media comprises recordable media.

59. The program product of claim 57 wherein the signal bearing media comprises transmission media.

60. The program product of claim 57 wherein the framework mechanism comprises:

at least one source object, the at least one source object including a first set of object methods to perform a plurality of predetermined functions to implement the source code repository environment;

at least one product object corresponding to a software product stored in the repository, the at least one product object including a second set of object methods to add a source code module to the at least one product object;

at least one release object corresponding to a release of the software product stored in the repository, the at least one release object including a third set of object methods to assign a specified version to the at least one release object and to identify a version specified in the release object for a specified source object;

at least one version object corresponding to a specified version of a source code module stored in the repository, the at least one version object including a fourth set of object methods to determine the previous version of the source code module based on the current version;

at least one data object representing at least one source code module that is stored in the source code repository; and at least one lock state object corresponding to each data object, the at least one lock state object including a fifth set of object methods for locking and unlocking a specified version of the at least one source code modules in a corresponding data object;

wherein the object oriented framework mechanism tracks the at least one release of the at least one software product according to extended portions of the framework mechanism that are customized to provide the desired source code repository environment.

* * * * *